April 23, 1968     D. A. WALLACE ET AL     3,379,067

SATELLITE THERMAL ENERGY INPUT SIMULATOR

Filed Sept. 17, 1965     14 Sheets-Sheet 1

INVENTORS
DONALD A. WALLACE
LAWRENCE R. KELLEY
DUANE L. GARBER
MARION R. BOTTORFF
EUGENE F. LOVEJOY

BY C. E. Vanstrum Jr. AGENT

D. Baxter Warren
ATTORNEY

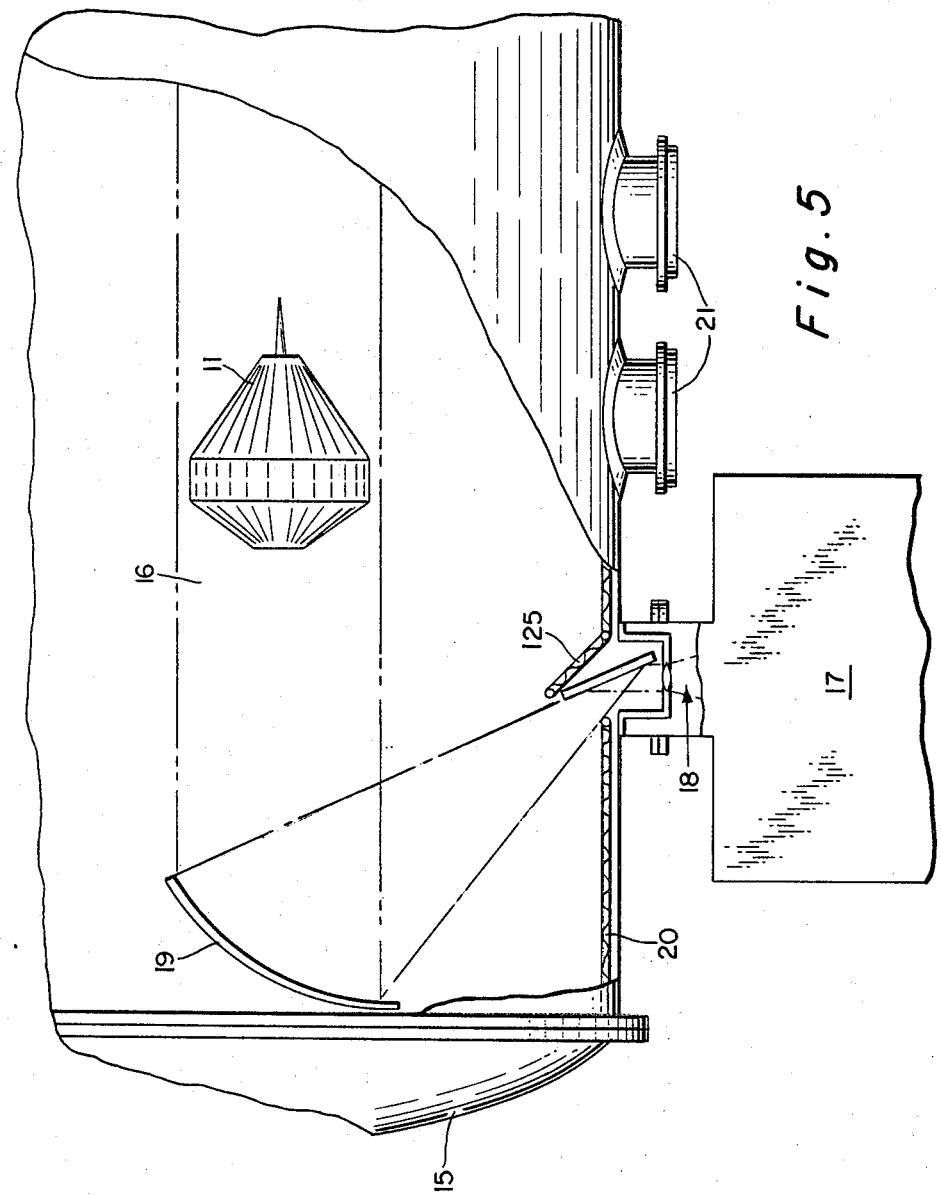

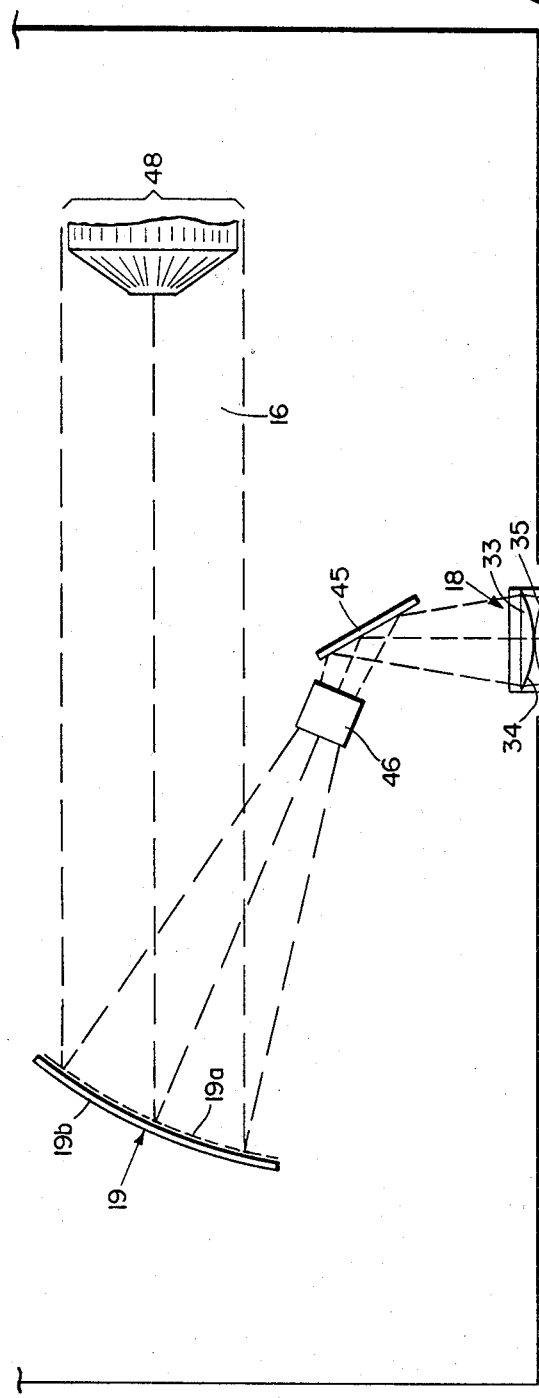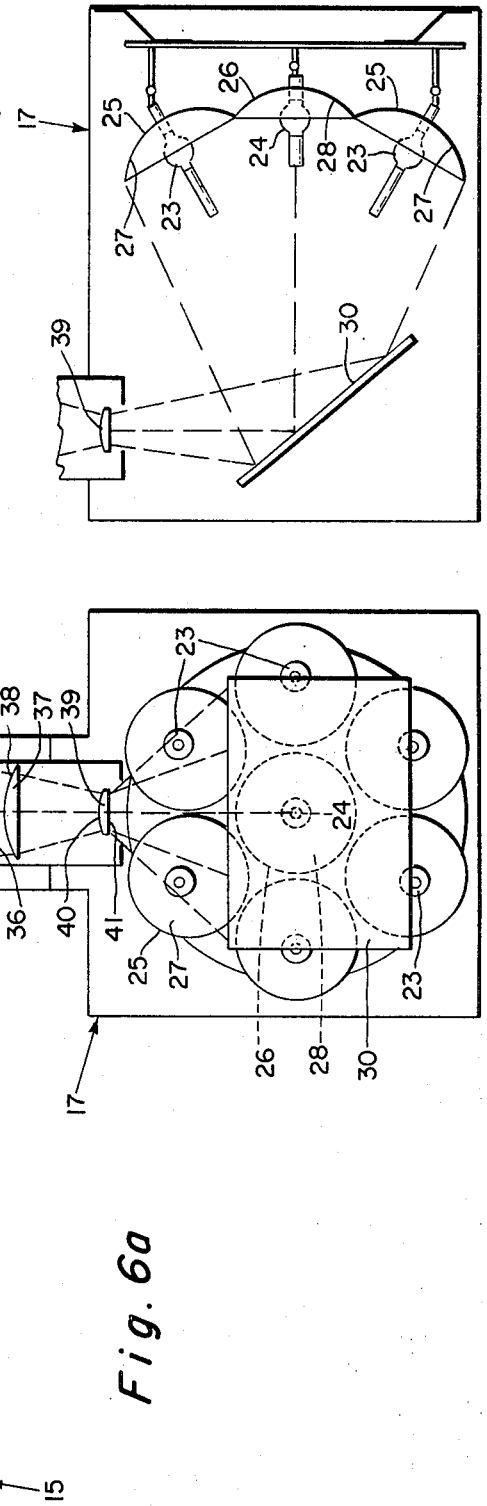
Fig. 6a
Fig. 6b

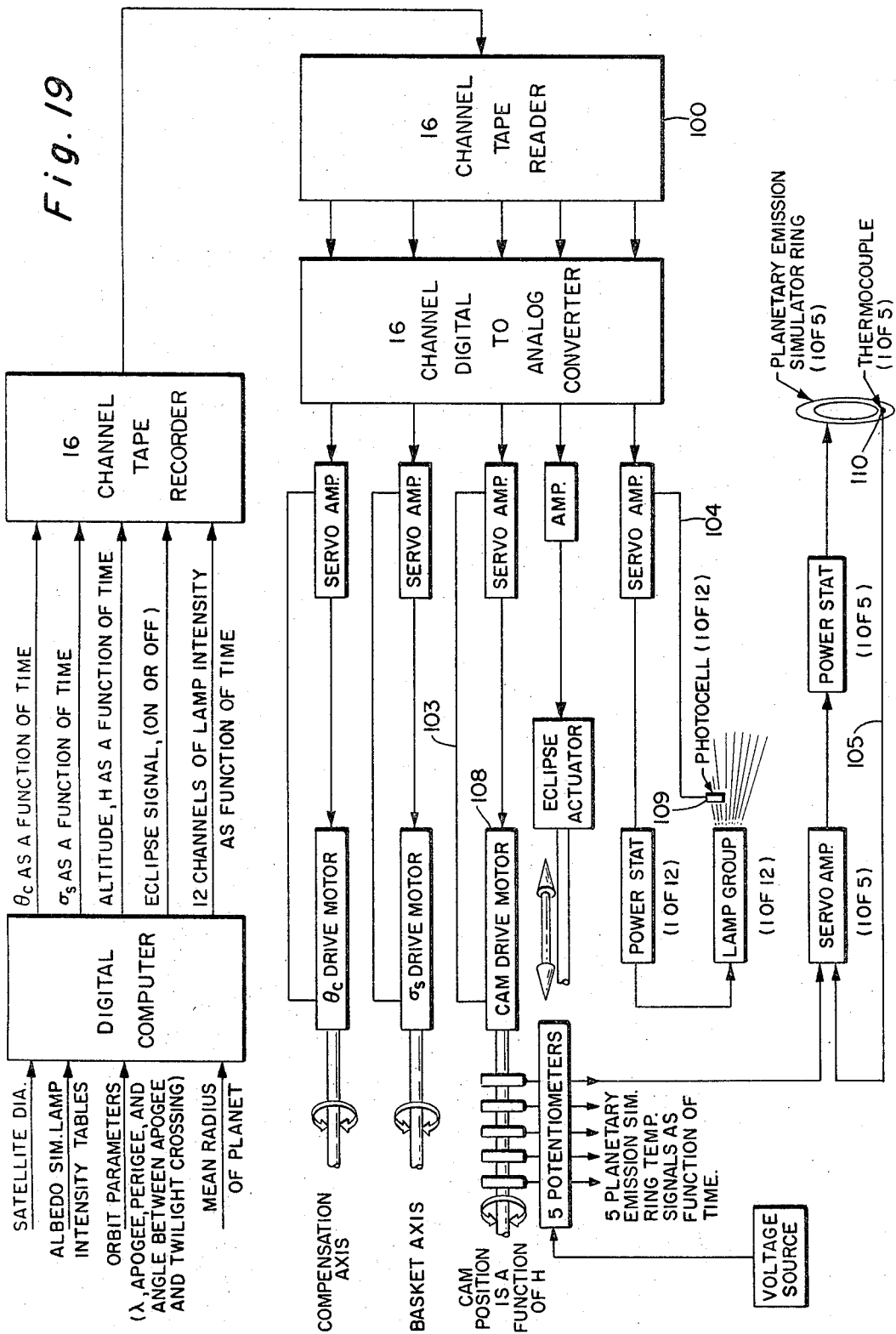

United States Patent Office 3,379,067
Patented Apr. 23, 1968

3,379,067
SATELLITE THERMAL ENERGY INPUT SIMULATOR
Donald A. Wallace, Oxnard, Lawrence R. Kelley, Inglewood, Duane L. Garber, Port Hueneme, Marion R. Bottorff, Oxnard, and Eugene F. Lovejoy, Newbury Park, Calif., assignors, by mesne assignments, to the United States of America as represented by the Secretary of the Navy
Filed Sept. 17, 1965, Ser. No. 488,294
24 Claims. (Cl. 73—432)

ABSTRACT OF THE DISCLOSURE

The present concept is directed to apparatus for simulating the environmental conditions of a satellite in orbit. A test chamber is provided in which an object designed to represent a vehicle in space may receive (1) radiant energy representing that received directly from the sun by a satellite, (2) radiation representing solar energy reflected from a planet, and (3) further radiation corresponding to that emitted by the planet itself. The balance of these energy fluxes will determine the absolute temperature level which will exist on the vehicle. Inasmuch as the radiant efflux is a function of vehicle orientation with respect to the sun, planetary orbit characteristics, and vehicle attitude relative to the orbit axis, all of these factors are taken into account in approaching as closely as possible a duplication of the thermal balance parameters for a near-earth orbit.

---

This invention relates to a means and a method for simulating the thermal inputs and outputs of an object in space and more particularly to a simulator for such bodies as satellites in a near-earth orbit.

In view of the very great and expensive efforts necessary to place objects into space orbits whether for observation, radiation detection and measurement, manned space travel, etc. it is desirable to design such objects to better withstand the conditions encountered in space to the greatest extent possible. Where satellite or other orbiting object operation relies upon or is affected by energy inputs from various radiant energy sources it is further desirable to observe and evaluate the operation of energy receiving and converting components to insure that a launched object will be prepared as well as possible to accomplish its space mission.

To achieve the maximum results from launched objects it therefore is desirable to simulate as closely as possible space conditions in laboratory test chambers, these conditions including substantial duplication of ambient pressures in the region of expected object or satellite travel as well as substantial duplication of radiant energy conditions at such altitudes. For example, a hyperaltitude chamber at the Naval Missile Center, Point Mugu, Calif., is quite capable of simulating satellite altitudes by means of a high capacity helium cooled cryopump and of achieving pressure altitudes well over $10^6$ feet. Such a chamber provides a space environment to the extent of low pressure and temperature but must be complemented by thermal balancing apparatus to substantially duplicate the radiant energy conditions encountered by an orbiting satellite.

In order to provide substantial duplication of the thermal energy inputs and effluxes incident to a satellite in orbit, the several sources of heat energy received in orbit must be substantially duplicated. These sources include the radiant energy received directly from the sun, termed insolation, sun radiation reflected from an adjacent planet or planets, termed albedo radiation, and radiation emitted by such planets themselves called planetary emission. The balance of these energy fluxes will determine the absolute temperature level which will exist on the satellite. Thus, if means may be devised for duplicating the various energy inputs into a satellite, considerable expense and effort may be saved by observing a model of the satellite in a simulated space environment within a laboratory thus determining the range of temperatures to which the satellite and its components will be exposed. To provide such a duplication of thermal inputs and effluxes, it is necessary that the position or attitude of the satellite throughout the entire orbit be considered since it is apparent that each of the sources of heat energy may vary during a revolution of a satellite.

Although devices exist for simulating the illumination of the earth by the sun and the motion of a satellite about the earth or of planets about the sun, there is not known a device which will simulate or substantially duplicate the radiant energy inputs to such a satellite. The present invention provides for the simulation of such inputs and effluxes of energy.

It is therefore an object of the present invention to provide a device and method for simulating thermal energy inputs from various radiant energy sources.

It is another object to provide a device for simulating the thermal inputs into a body in space and the attitude assumed from time to time by such body in a selected orbit.

It is a further object to provide in a laboratory a means for observing the effect of thermal energy inputs into an orbiting satellite.

A still further object is to provide simulated solar energy in a thermal energy input simulator which includes a selected sprectral distribution of solar radiation.

Another object is to provide simulation of solar, albedo and planetary emissions in a laboratory chamber substantially simulating pressure and temperature conditions in space.

Another object is to direct simulated solar, albedo and planetary emissions toward an object which is suspended in a test chamber in such a manner as to simulate cold, black space in directions other than those from which the simulated emissions appear.

Another object is to simulate in a test chamber within the range of simulated solar, albedo and planetary emissions the orbital motion and spin of a satellite in orbit.

Other objects and many of the attendant advantages of this invention will be readily appreciated as the same becomes better understood by reference to the following detailed description when considered in connection with the accompanying drawings in which like numerals designate like parts throughout and wherein:

FIG. 5 is a schematic view of a portion of a hyperaltitude chamber adapted to accommodate the thermal simulation unit of the present invention;

FIG. 6A is a schematic view of the optical elements required to collect the light energy and blend and direct a solar beam to a test satellite;

FIG. 6B is a side view of the housing of the optical elements illustrated in FIG. 6A;

Figure 8:
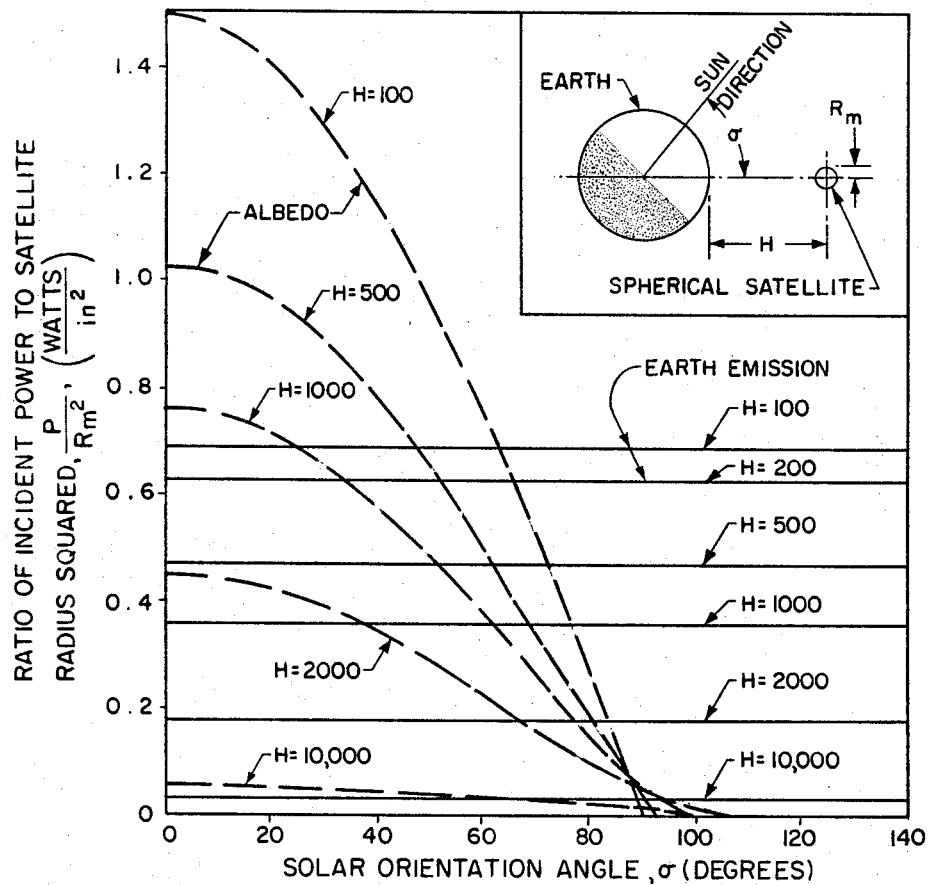
Figure 13:
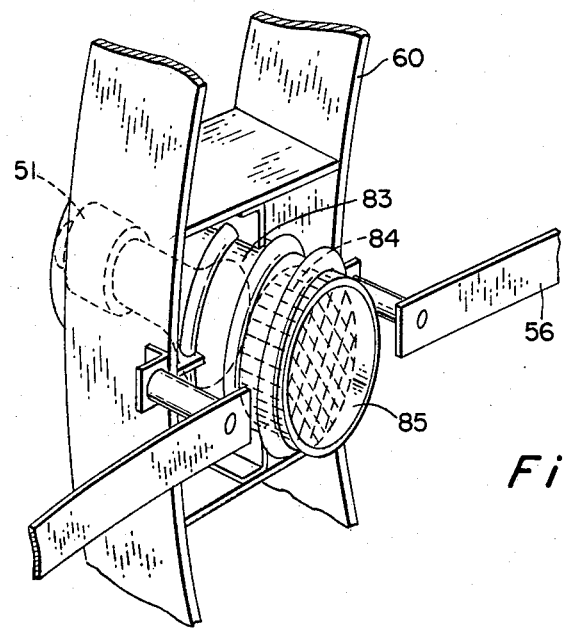
Figure 20:
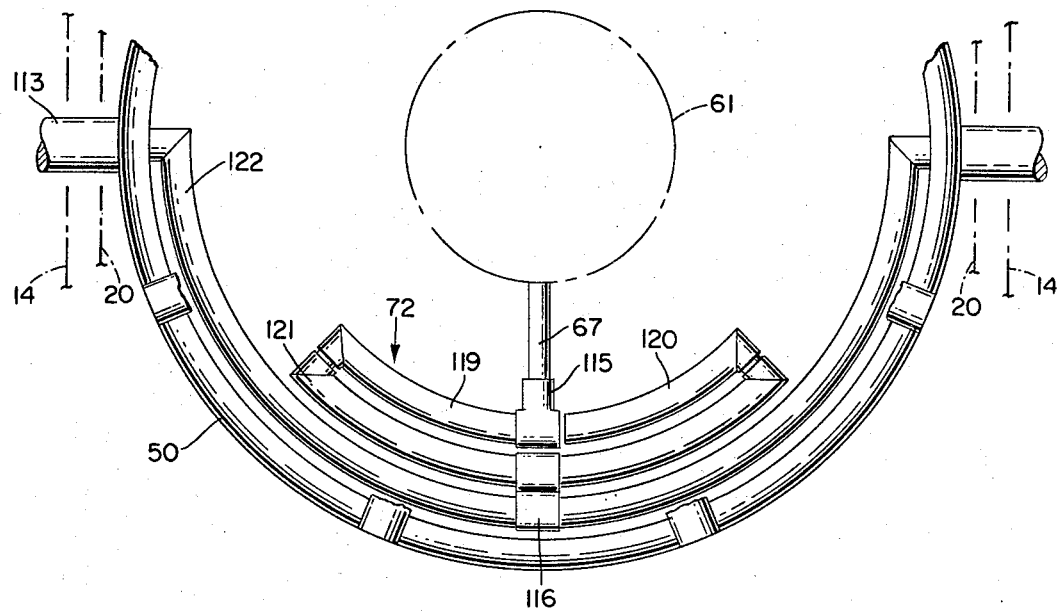
Figure 9:
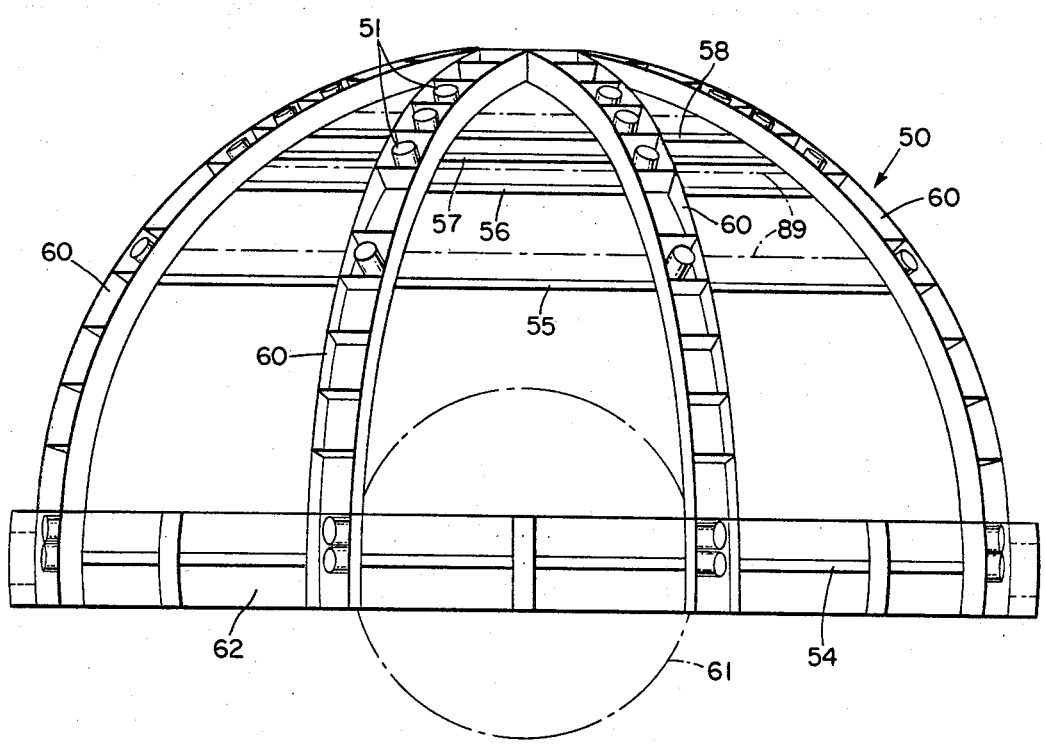
Figure 10:
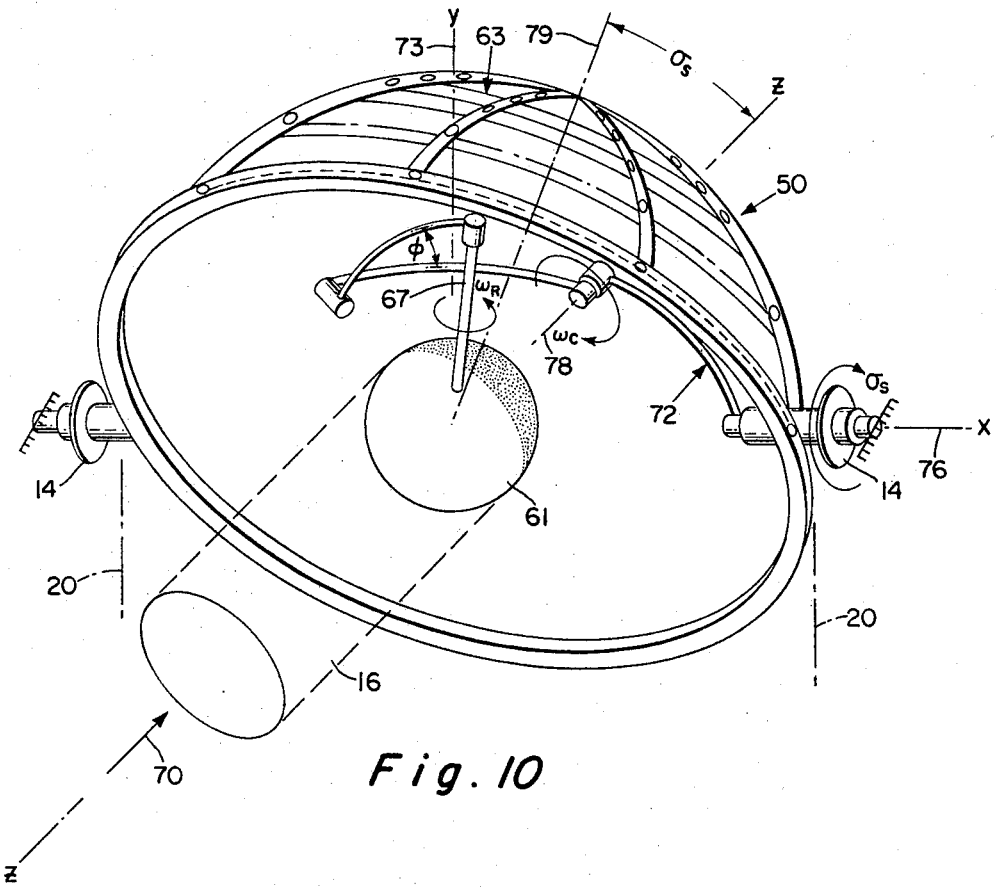
Figure 11:
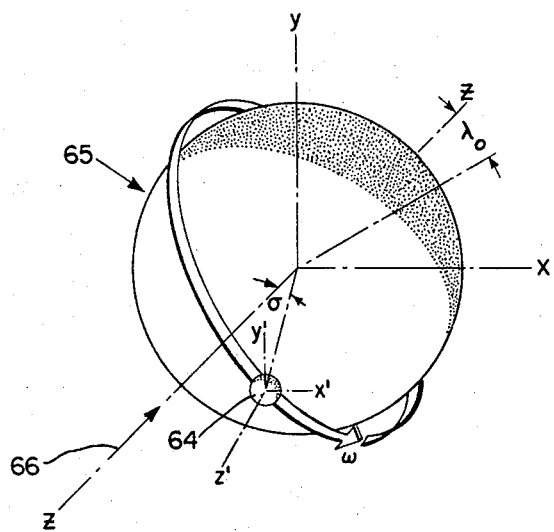
Figure 12:
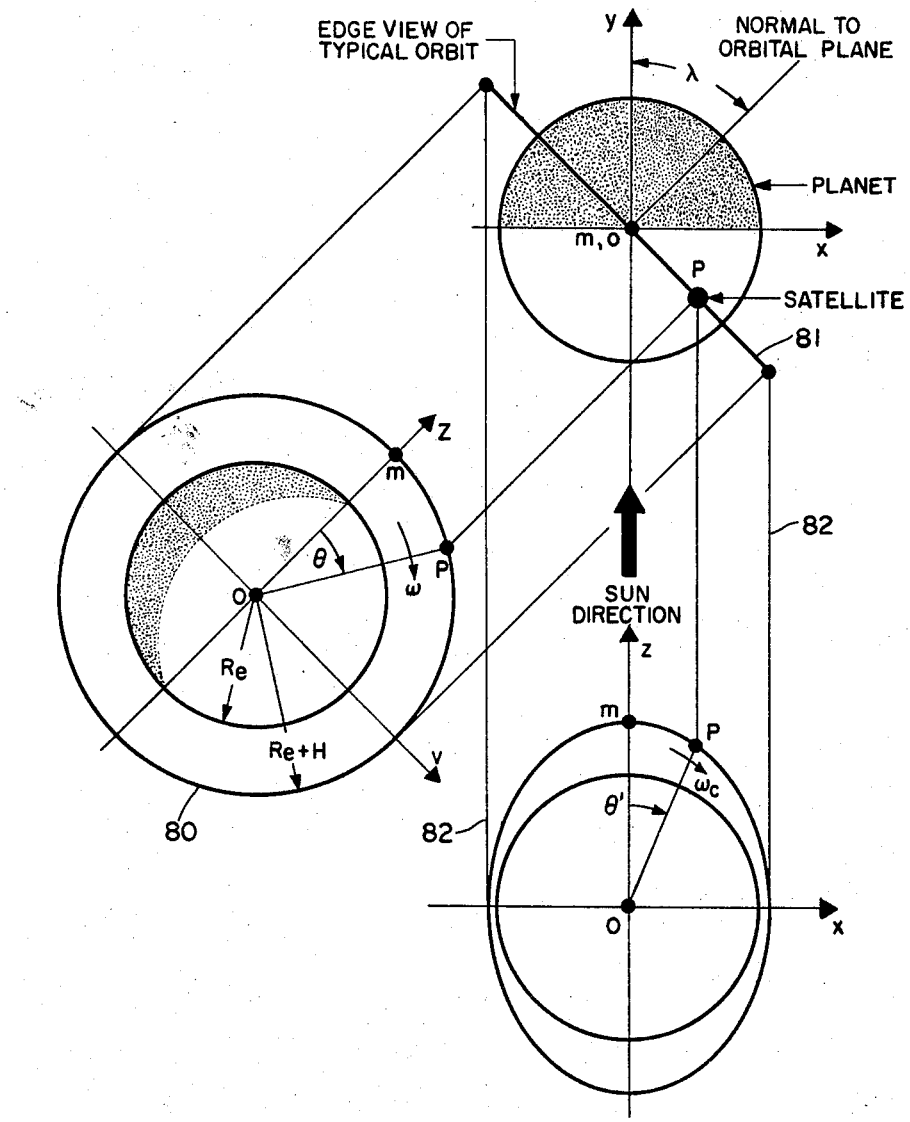
Figure 14:
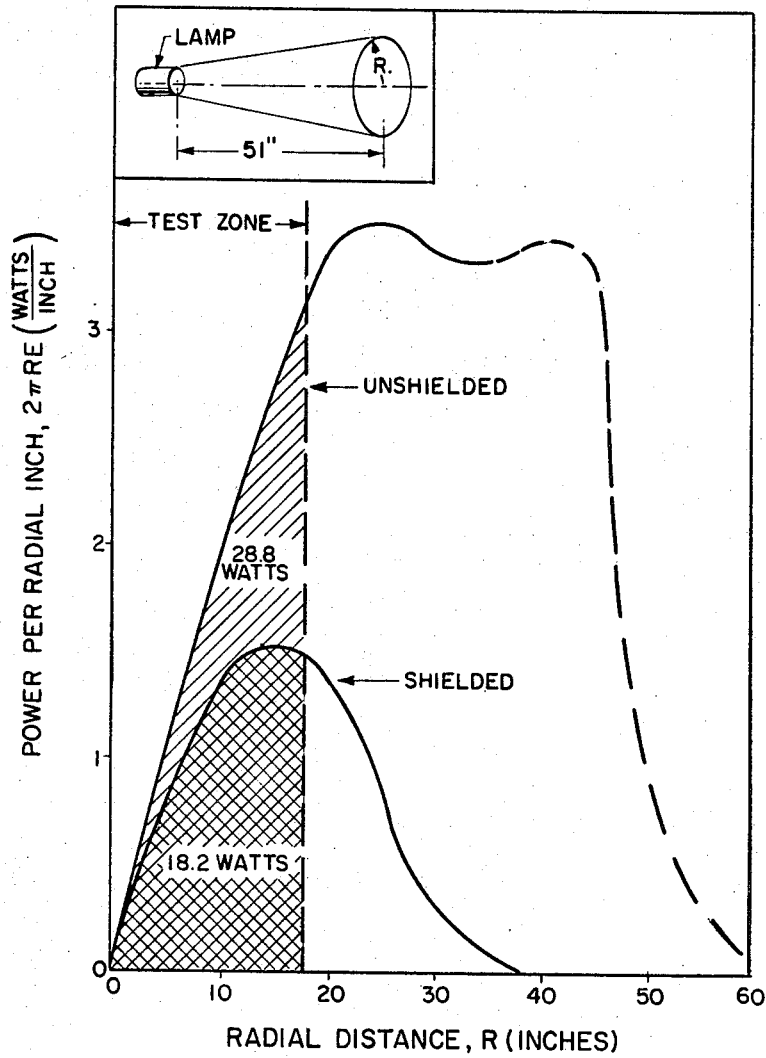
Figure 15:
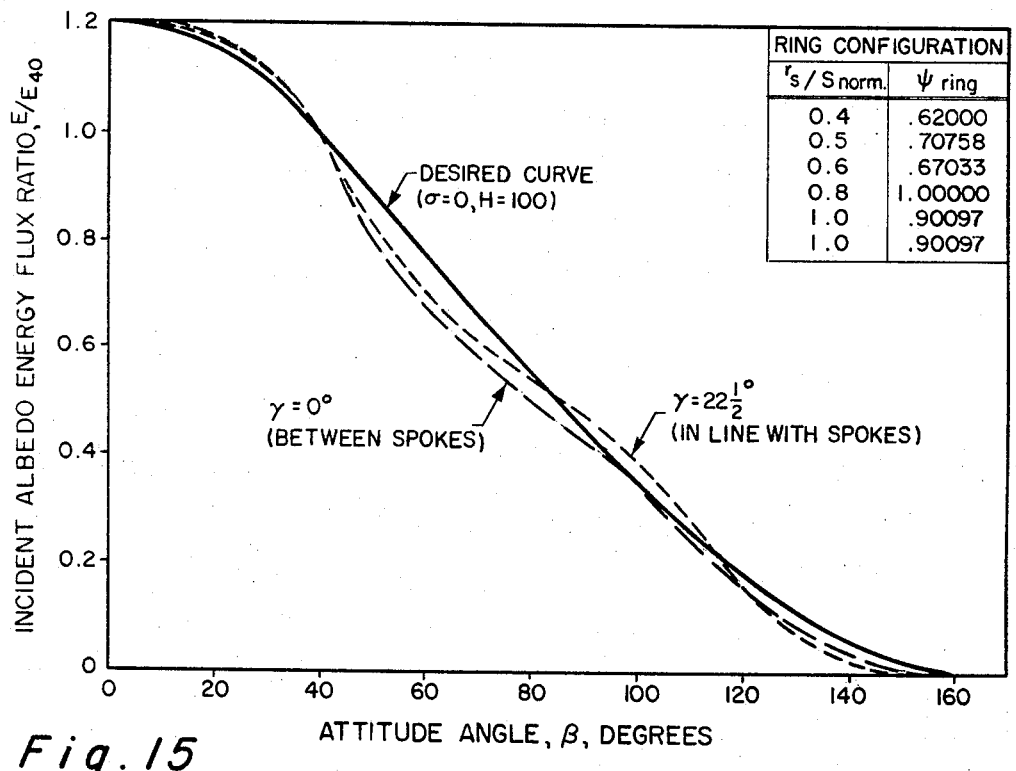
Figure 18:
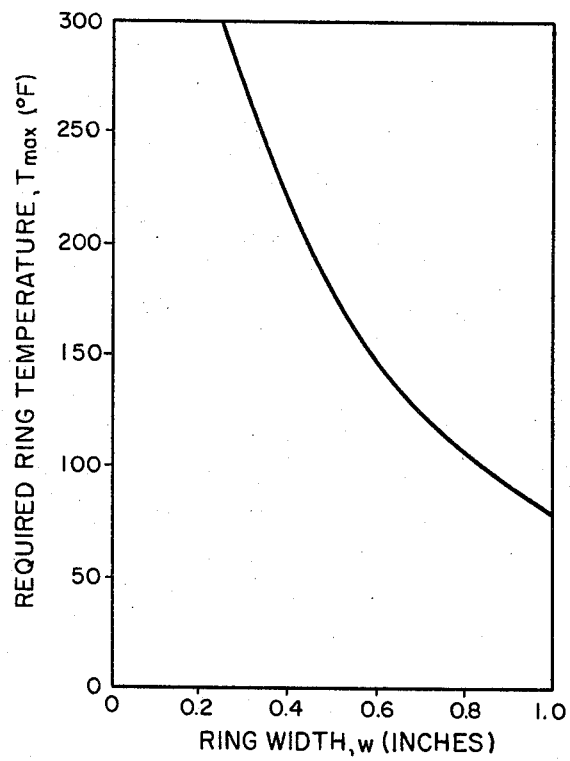
Figure 16:
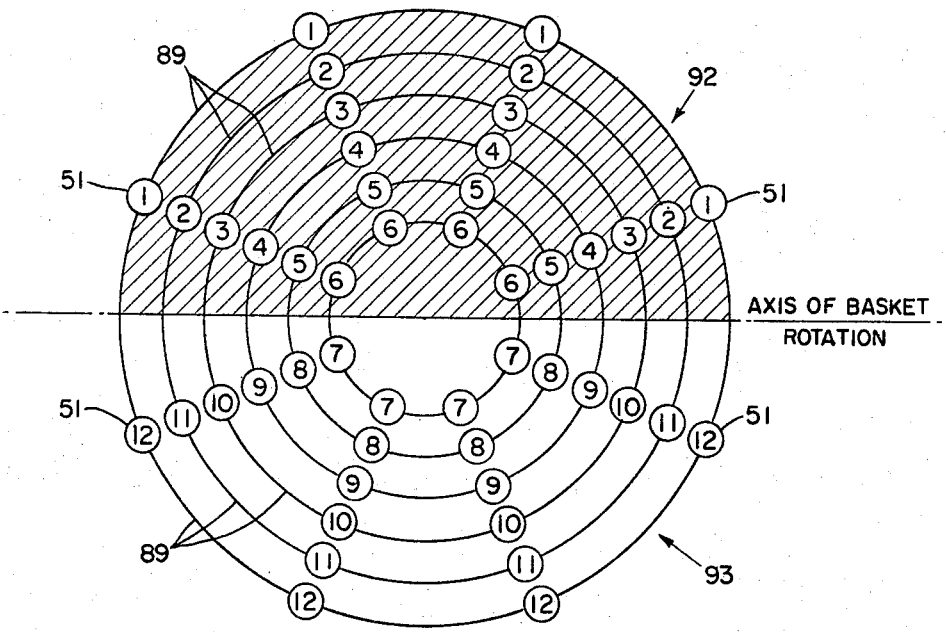
Figure 17:
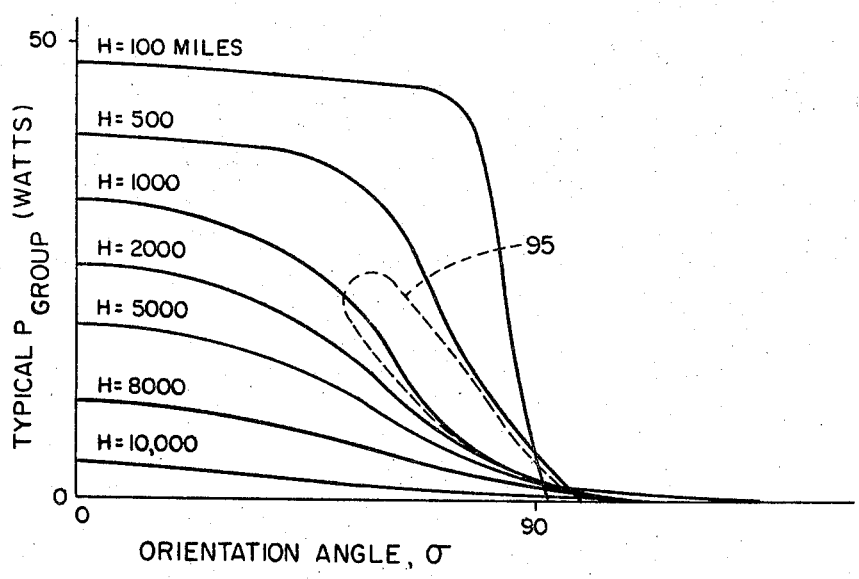
Figure 21:
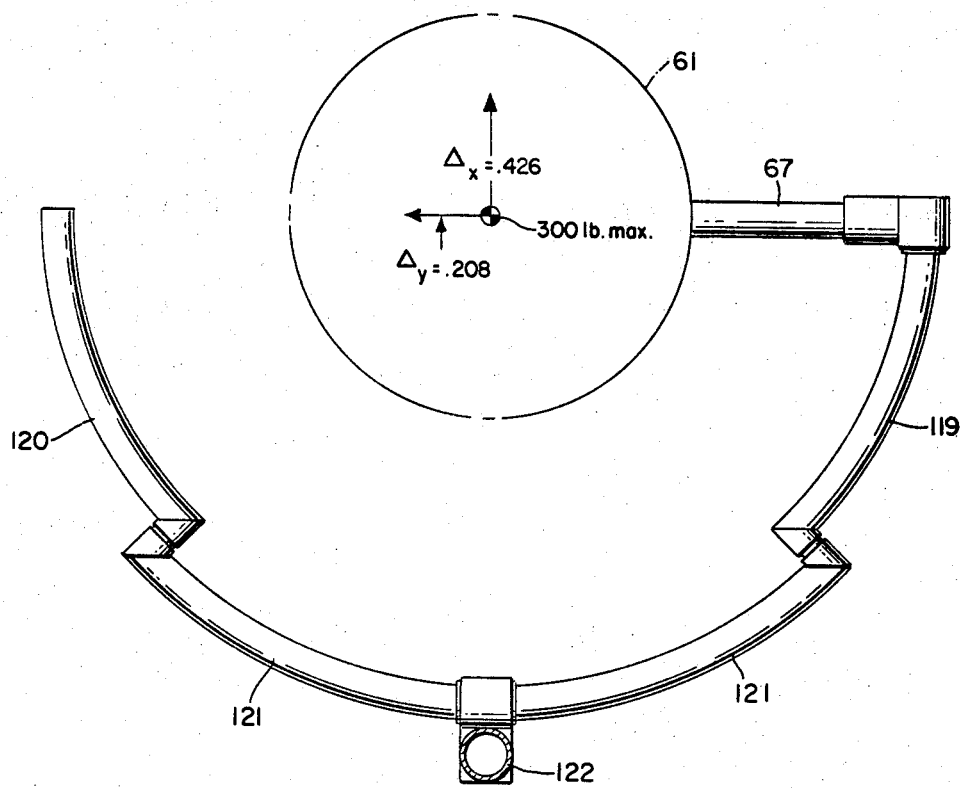

FIG. 8 presents graphically the albedo and Earth incident on a spherical Earth satellite at various altitudes;

FIG. 9 is an isometric view of the albedo emission simulator basket;

FIG. 10 illustrates the relative motions between a test satellite, the albedo-planetary emission simulator array, and the beam simulating solar radiation of the present invention;

FIG. 11 shows the relative motions between a satellite, the planet around which it moves in orbit and the sun direction;

FIG. 12 shows two projections of a circular orbit of a satellite orbiting a planet;

FIG. 13 is an enlarged isometric view of the mounting for lamps positioned in the albedo emission simulator;

FIG. 14 is a graph presenting power distribution of a selected lamp with and without honeycomb shielding;

FIG. 15 presents graphically as comparison of the simulated and real albedo flux distribution;

FIG. 16 is a schematic diagram showing the division of rings of lamps into zones and groups;

FIG. 17 illustrates a set of curves for one of the groups of lamps;

FIG. 18 is a plot of ring temperature versus ring width for determining the maximum ring temperature required to simulate planetary emission at a satellite altitude of 100 miles;

FIG. 19 is a block diagram of an albedo-planetary emission control simulator;

FIG. 20 is a side elevation view of the structure for imparting motion to a test satellite; and FIG. 21 is a changed position plan view of the structure shown in FIG. 20.

Figure 1:
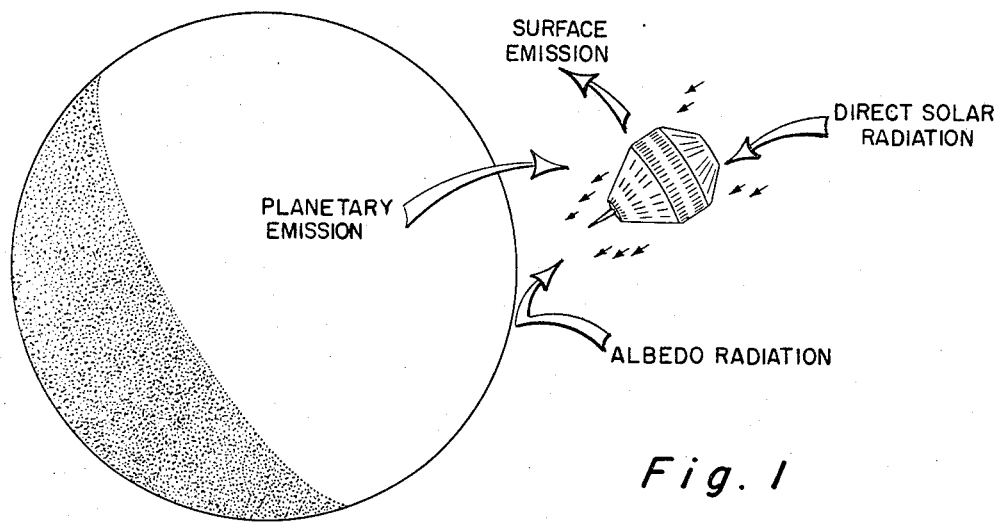
FIG. 1 is a schematic illustration of the various heat inputs to which a space vehicle may be subjected.

As demonstrated in FIG. 1, a vehicle in space receives radiant heat energy directly from the sun, albedo radiation or reflected sun radiaton from a planet and planetary emission or radiation emitted by the planet. The vehicle re-radiates energy from its surface into cold black space, and it is the balance of these energy fluxes which determines the absolute temperature level which will exist on the vehicle. This level is simulated by the device of the present invention. Aerodynamic heating becomes a factor only when the vehicle is at such a distance from the planet that sufficient particles exist to cause such heating.

The heat loads indicated in FIG. 1 represent the thermal inputs to a space vehicle such as a satellite, and to duplicate or substantially duplicate such thermal inputs a simulation device should provide radiant energy in the form of a beam or plurality of beams having selected intensity, selected spectral distribution of radiation and appropriate convergence or collimation of the radiation. Satellite configuration and attitude also are involved, the latter relating to relative changes between the satellite and planet and between the satellite and insolation due to satellite progression along it orbit or satellite rotation. Since duplication of the sun-planet-satellite relationship would be unduly complex, the concept of simulation, i.e. computing the satellite heat load as closely as possible for a particular satellite configuration and specified orbit, has been adopted.

Figure 2:
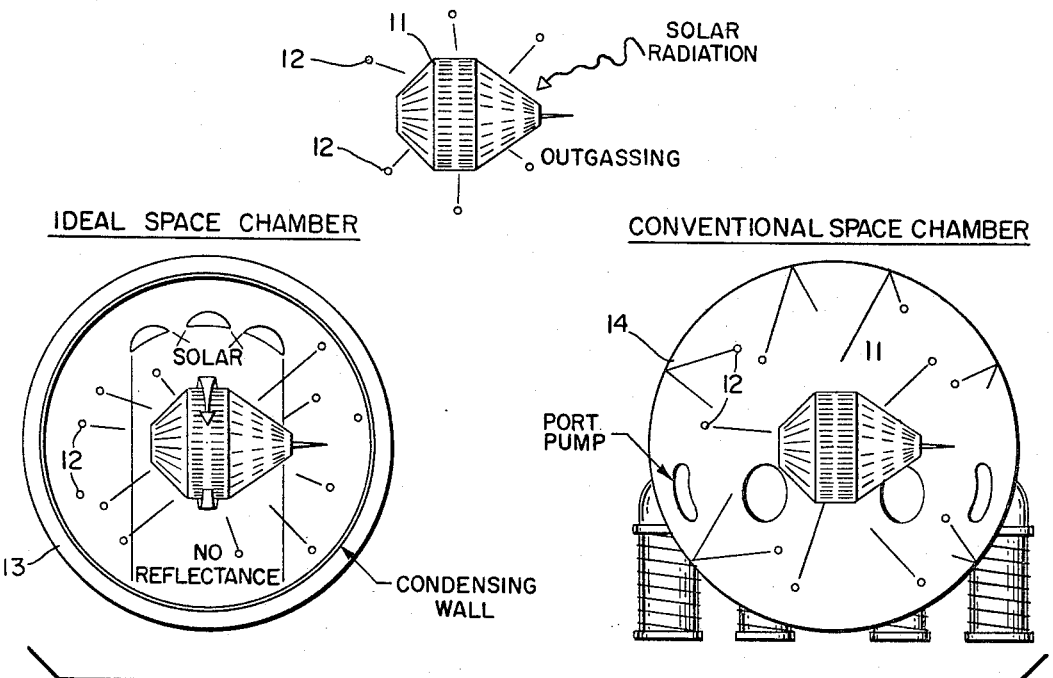
FIG. 2 illustrates schematically an ideal space chamber, a conventional space chamber and the action of molecules produced by outgassing.

A calculated unit heat load may be applied to the test satellite in a space environment duplicating chamber, two examples of which are shown in FIG. 2, by means which will be described in relation to the remaining figures. The unenclosed satellite 11 is represented as having gas molecules 12 leaving the satellite and with the satellite subjected to the input of solar radiation. The pertinent heat loads indicated in FIG. 1 may be reproduced in the ideal space chamber 13 or the conventional space chamber 14 shown in FIG. 2. Since the ideal chamber does not exist and conventional chambers require modification to accommodate the heat elements of the present simulator, this invention may be practiced within such hyperaltitude chambers as may accommodate the structural and heat producing or conducting elements in a setting which substantially duplicates cold black space for experimental and test purposes.

Figure 3:
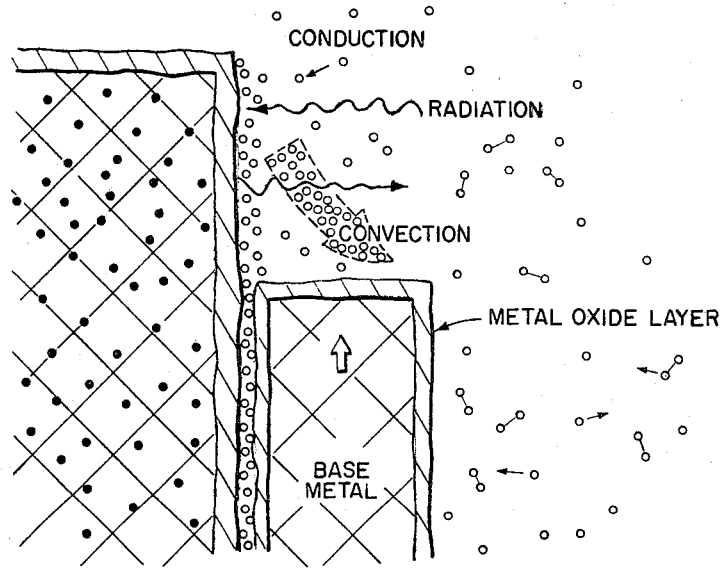
FIG. 3 depicts schematically in greatly exaggerated fashion a normal atmospheric environment and the manner in which heat is transferred to and from materials in such an environment.

Referring now to FIG. 3, there are demonstrated the normal characteristics of the earth's atmospheric environment. In such an atmospheric environment, heat is transferred to and from materials by the gross action of molecules, i.e. conduction and convection, and by radiation. The gas molecules are chemically combined with materials to form surface oxides and nitrides. Normally the true base metal is never seen. Materials which come in contact with other material slide on a layer of air molecules. Minute welds form and then break, and air immediately heals the break with a new oxide layer.

Figure 4:
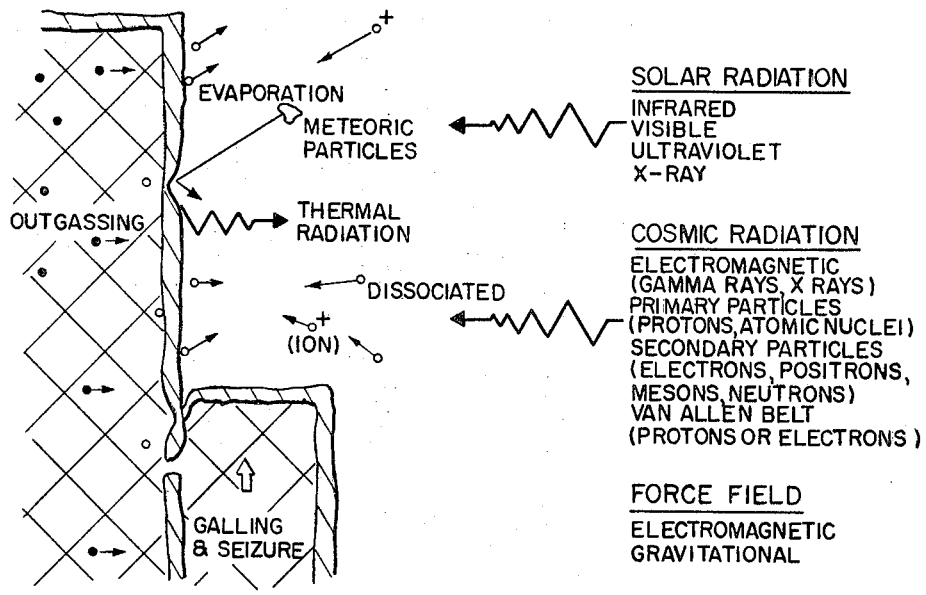
FIG. 4 is illustrative of a natural space environment wherein gas particles are dissociated and possibly ionized.

In the space environment of FIG. 4, gas particles are illustrated as dissociated and possibly ionized. The density is no longer high enough for conductive and convective transfer, hence the radiation carries the heat load. Materials lose their absorbed layer of gas molecules, and gases in solution in the metal migrate out. The material itself may begin to evaporate, and since there is very little ambient gas to heal weld breaks, friction builds up quickly and may lead to seizure. Other influences exist such as solar radiation, high energy particles, etc. In addition to these natural phenomena, man creates his own environment of vibration, shock and reaction-jet exhaust products. Changes which occur in material properties as a result of these effects fall into two categories, those changes due to individual particle actions and those resulting from accumulative effect. These effects determine the range of pressures required to test surface-effect problems.

Emissivity may be considered the most important material property in the heat balance of a satellite in space, and since all heat in space is transferred by radiation the emissivity determines the proportion of the incoming radiation that will be absorbed. Emissivity is associated with the first couple of molecular layers of a material so that as evaporation, for instance, takes place and the surface condition is altered, the emissivity and thus the heat balance of a satellite may change.

In simulation, wherein the present invention resides, the satellite heat load may be computed as closely as possible for a given satellite geometry and a specified orbit. The calculated heat load may then be applied to the test item in a chamber such as the conventional chamber 15 shown in FIG. 5, the ideal space chamber having solar radiation directed toward the test item and striking only from one side with no reflectance whereas the conventional chamber may have various sources of radiation and may re-radiate reflected energy from the interior surfaces of the chamber toward the vehicle.

Chamber 15, adaptable for the present invention, is shown in FIG. 5 wherein satellite 11 is positioned in the path of and receives energy from a single beam 16 simulating solar radiation, the beam 16 containing components that give an approximation of the natural thermal efflux in conjunction with the satellite thermal characteristics. Solar beam 16 may originate exterior to chamber 15 such as in solar lamp housing 17 and may be directed by optical elements indicated generally at 18 to collimator 19 which is located off-axis so that the satellite cannot see itself in the optics. Cryogenic liner 20 provides a cold sink for the purpose of simulating space conditions while view ports 21 may be included to permit inspection of satellite 11 under the simulated space conditions. The optical elements 18 and lamp housing 17 will be described in greater detail later in the application as will be a separate heat input simulation covering planetary emission and sun radiation reflected from the planet. Under the composite radiant energy inputs and effluxes the satellite's equilibrium skin temperature may be measured.

The characteristic parameters of solar beam 16 may be defined as (1) the spectral distribution of energy versus wave length, (2) the collimation of the radiation and (3) the intensity level of the radiation. As the sun radiates ultraviolet, visible and infrared radiation uniformly in all directions with a spectral distribution similar to that of a 6,000° K. black body, it can be shown that approximately 98% of the total energy should be emitted at wavelengths between .35 and 2.4 microns. Since available radiation sources do not have the exact spectrum desired, selective filtering has been included in the optical system of the invention to compensate and to match as closely as possible the distribution curve required as will later be described.

As for the uniformity of the intensity produced in artificial solar beam 16, the amount of distortion acceptable has been determined to be a function of the material characteristics of the satellite's surface area. An intensity of 1400 watts per square meter has been chosen for the maximum solar intensity of the beam in the present embodiment. An intensity variation of the order of 6% is considered acceptable, and a suitable sensor for determining the intensity preferably is one which is compatible with the largest discrete area over which an intensity variation effect is negligible.

The decollimation angle, the maximum angle between any two rays in the beam, is of importance in that it affects the amount of energy that will be adsorbed by various panels of the test satellite. The degree to which decollimation affects the amount of energy absorbed depends on the angle of incidence at which the beam as a whole impinges upon the surface. At an angle of incidence of zero there is no effect while at an angle of incidence of 90° the effect may be infinite on a percentage basis. Fortunately very little energy is involved at angles approaching 90° because of the cosine effect. The optical configuration of the present embodiment, shown hereafter in more detail, provides a solar beam 16 having a natural decollimation half angle of plus or minus 2½ degrees compared to 16 minutes for sunlight at Earth. This difference produces an error in the absorbed energy of less than 4% at an angle of incidence of 60 degrees.

The radiant energy source selected to simulate the solar distribution spectrum to be matched has been determined to best be provided by high pressure arc lamps. In the present embodiment shown in FIGS. 6A and 6B, a source combination of six 5 kw. xenon lamps 23 and one 5 kw. Hg-Xe lamp 24 has been selected to simulate solar energy input. Lamp 24 compensates for the loss of energy in the ultraviolet region due to absorption in the refractive optics of the system. FIG. 6A is a side elevation showing schematically the primary components of the optical and solar simulation systems. Lamps 23 and 24 are disposed symmetrically in lamp housing 17 which housing preferably is cooled by air moved by an intake fan, not shown, having a capacity of 4,000 c.f.m. FIG. 6B shows the lamps in a side view indicating that the peripheral lamps 23 have reflectors 25 which are angled with respect to center reflector 26 to converge the light rays toward a plano reflecting mirror 30. Mirror 30 folds the collected beams together for entry into the projection lens system. Reflectors 25 and 26 are preferably ellipsoidal and have their reflecting surfaces 27 and 28, respectively, processed with suitable interference filters, not shown, such as Bausch and Lomb Balcold 90–8 coating to provide a close match with solar radiation through selective wavelength filtering.

Projection lens system 18 preferably includes four cooled lenses, lens 33 having air filtered to one micron at substantially 30° C. blown against its convex surface 34, lens 35 having similar air blown against its planar surface 36, lens 37 having air filtered to one micron at substantially 40° C. blown against its convex surface 38, and lens 39 having filtered air at substantially 30° C. blown against surfaces 40 and 41. Collimator 19 preferably is constructed of a plurality of mirror segments, 19a supported a selected distance, of the order of 1 inch, from a mounting pad 19b which preferably is made of stainless steel. The projection lens system 18 forms the boundary between the hyperaltitude chamber 15 and the lamp housing 17.

Radiant energy is introduced into chamber 15 by means of plano mirror 45 and integrator 46, mirror 45 having its back covered with a liquid nitrogen shield, not shown, and integrator 46 being surrounded with a liquid nitrogen collar, not shown, both of these liquid nitrogen shieldings as well as the cooling air which is circulated around the lenses 33, 35, 37 and 39 providing for removal of the heat which may be expected to collect at each part of the projection lens system 18. The integrator causes the particular radiation emanating from each lamp 23 and 24 to be superimposed over the entire field reflected by the collimating mirror.

Collimator 19 has a diameter of 54 inches in the present embodiment and is an off-axis paraboloid made up of the aforementioned segments which approximate a spherical surface. These segments preferably are held by epoxy cement to individual alignment blocks, not shown, behind each segment. The projected solar beam 16 may be 36 inches in diameter in the test section of chamber 15 creating a one solar constant over a three-foot diameter target area 48 in which satellite 11 is positioned.

With respect to albedo and planetary emission simulation, the effective radiant energy source for albedo is the sunlit portion of the planet and that for planetary emission is the entire planet. One of the more important parameters to be ascertained for this simulation has been determined to be the amount of thermal energy absorbed by any given point on the surface of the satellite. This parameter is a function of the form factor between the point which can be thought of as a small flat plate and a radiant energy source, the intensity of the radiant energy source, and the absorptivity of the surface with respect to the spectral distribution of the radiant energy source.

Figure 7:
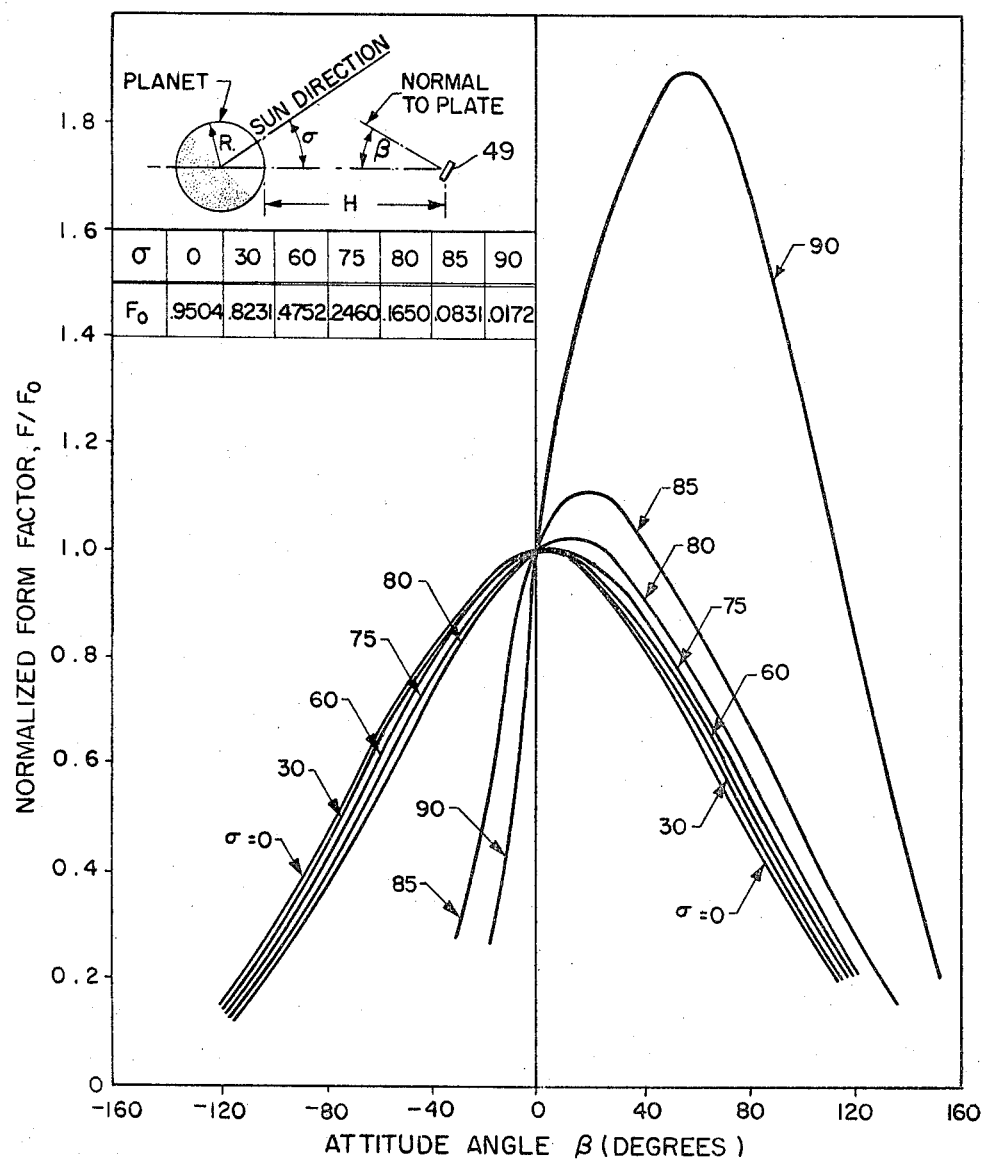
FIG. 7 is a graphical presentation of the theoretical form factors for various points on a satellite 100 miles above the Earth.

FIG. 7 presents a comparison of the normalized form factor between a small flat plate 49 oriented at various attitude angles $\beta$ and the sunlit portion of a planet of radius $R=3959$ miles located 100 miles (H) from the plate. The normalized form factor $F/F_0$ which is the ordinate for the graph of FIG. 7 has a value of 1 when the attitude angle $\beta$ is zero, i.e. when plate 49 representing a portion of the satellite surface looks directly at the planet about which it is orbiting. A set of curves for similar factors with respect to an altitude of $H=100$ miles, not shown, may be used to establish that while the absolute values of the form factors $(F/F_0)F_0$, change widely with the sun-planet-plate angle $\sigma$, and also with altitude H, the normalized distribution of incident energy $(F/F_0)$, around a satellite remains relatively fixed except when the twilight line (the great circle on the Earth perpendicular to the Earth-Sun line) is approached. It may be shown that the departure from symmetry shown in FIG. 7 occurs more rapidly with respect to $\sigma$ for high altitudes than for low altitudes. This is to be expected because the twilight line comes into view earlier at high altitude.

The intensity of both the albedo and planetary emission radiant energy sources, but most particularly albedo, depends on whether or not the planet has an atmosphere, and also on whether the underlying terrain is covered with rock, water, ice or vegetation. Since Earth is presently the most important planet for albedo and planetary emission simulation, for the purposes of the present invention it may be assumed that all points on the sunlit portion of the planet reflect diffusely with a uniform reflectivity equal to the mean value. All points on the planet also may be assumed to emit at an intensity corresponding to the main surface temperature and emissivity. Since the spectral distribution of albedo depends upon many of the same factors as the total intensity, it also may be assumed that albedo has the same spectral distribution as direct solar radiation.

For the purpose of the present invention, it is assumed that a planet will reflect uniformly according to the Lambert Cosine Law, and thus that the albedo form factor may be computed by integrating the energy received by a flat plate from all points in the sunlit area. It has been determined and discussed in relation to FIG. 7 that the normalized distribution of incident energy around a satellite remains relatively fixed except when the twilight line is approached. In the simulations of the present embodiment, it has been found advisable to attempt to duplicate the non-symmetrical shifts for sun-planet-satellite angles of 85° or greater and to ignore the slight non-symmetrical shifts for angles below this value.

As to the simulation and computation of the planetary emission form factor distribution, this factor differs in only two ways from that of albedo, first, it does not vary with the sun-planet-satellite angle because the planet is assumed to emit from the shaded side as well as from the sunlitside. Secondly, the local intensity of planetary emission is uniform over the planetary surface while the local intensity of albedo is directly proportional to the cosine of the angle between the local normal and the planet-sun line. The planetary form factor distribution is therefore susceptible of being computed with known equations which has been done.

Having determined the normalized albedo and planetary emission form factor distribution, the total amount of incident power from each of these sources may be determined by integrating over the satellite's surface. In the present simulator, the satellite is assumer to have a spherical shape and although the results would also apply if the satellite were non-spherical provided it is small compared to the simulator radiant energy array so that all points esentially are an equal distance from the array. In either case, the power requirement may be determined by integrating the energy distribution around the surface of a sphere. For example, the distribution of albedo energy for a sun-planet-satellite angle of zero and an altitude of 100 miles can be approximated very closely by the equation $E/E_0 = \cos^3(\beta/2)$, where E is the energy flux incident at any point located $\beta$ degrees from the satellite-planet line, and $E_0$ is the energy flux incident at the point where $\beta$ equals zero. By integration it can be shown that for a three-foot diameter circular satellite oriented at an angle between sun-planet-satellite of zero degrees and at an altitude of 100 miles the total incident power due to planet albedo is 486 watts.

Since the normalized energy distribution curve for planetary emission is practically identical to the sun-planet-satellite angle of zero degrees albedo curve for the same altitude, the same approximation (i.e. the equation above) is valid and only the value of $E_0$ in the integrated equation need be changed. Consequently, for a three-foot diameter spherical satellite located 100 miles above the planet Earth the total incident power due to Earth emission may be shown to be 223 watts. These examples show the manner in which the power required to simulate albedo and planetary emission can be computed by approximating the form factor distribution curves with a simple expression. If the distribution is non-symmetrical, which it is in all albedo cases where the sun-planet-satellite angle is other than zero, a double integration is required.

FIG. 8 shows a summary of Earth albedo and Earth emission power requirements for several altitudes as a function of the orientation angle $\sigma$. In the insert in FIG. 8, the sun-planet-satellite angle $\sigma$ is illustrated along with the altitude H of the satellite above the Earth's surface and the satellite radius $R_m$. It is evident from FIG. 8 that planetary emission varies considerably with altitude but albedo varies grossly with both angular position and altitude. Moreover, the direction from which planetary emission and albedo impinge on the satellite will change continuously through the orbit even if the satellite has no spinning motion about an axis of its own. From the foregoing it should appear that simulation of motion effects is an indispensable part of simulating albedo and planetary emission.

In devising a simulator to simulate the albedo and planetary emission radiation, a configuration has been decided upon which overcomes many of the disadvantages of systems involving a simulator plate or a full hemispherical shell. The preferred configuration is shown in FIG. 9 and generally is the form of a hemispherical basket framework 50 supporting a plurality of lamps 51 and having a series of radiation emitters in the form of five narrow circular rings 54, 55, 56, 57 and 58 which are fastened to the basket. The basket includes a plurality of spokes 60 which support lamps 51 and rings 54–58, a total of eight spokes being shown merely as illustrative of one embodiment. The open framework of basket 50 presents a minimum blockage area toward the test satellite 61 which preferably is placed as indicated at the center of the equitorial belt 62. Such a basket is advantageous because, among other things, it does not significantly block the solar beam when the basket is interposed between the test article and the beam, it does not require cooled structural components or other mechanical devices so as to impose a non-symmetrical energy flux distribution on the test article, and the small area presented to the test article by the basket structure minimizes the chance of energy emitted by the solar beam or the test article itself being reflected back on the test article.

In the embodiment of FIG. 9 the lamp units 51 simulate albedo emission while the circular bands or rings 54–58 simulate planetary emission. The small form factor between the basket structure and the test article allows the apparent subtended view angle to be varied by merely switching on or off some of the lamps 51 and radiation-emitting rings 54–58 in the outer regions of the array. When the lamps and rings are off, the test article "sees" practically nothing but cold shroud. A further advantage of the open structure is that the spectral distribution of the lamps more closely matches that of albedo than does the spectral distribution of a warm plate, shell, or similar closed structure.

In order adequately to simulate the effects associated with orbital motion and satellite spin or tumble motion it has been found necessary to vary with time the magnitudes and the direction of the three simulated radiation fluxes, i.e. solar, albedo and planetary, incident on the test article. This is accomplished by incorporating the fixed array of lamps 51 which move as a body with the basket around the test satellite. The relative locations of the lamps are important with respect to obtaining the proper energy flux distribution.

FIG. 10 shows the relative motion between test satellite 61, the albedo-planetary emission simulator array indicated generally at 63 and the simulator beam 16. FIG. 11 shows the relative motion between a satellite 64, the planet 65 around which it moves in orbit, and the sun direction 66. Any spin rates a satellite may have about the three axes X', Y' or Z' may be resolved into a single resultant spin direction with respect to the sun direction. The simulation of satellite spin as far as direct solar radiation is concerned basically involves mounting test satellite 61 on a motor driven shaft 67 in such a way that it rotates at the proper speed about an axis which is skewed at the proper angle from the solar simulator beam direction 70. The manually adjustable degree of freedom of the satellite support structure 72, indicated in FIG. 10 as $\phi$, allows motor driven spin axis 73 to be oriented at any angle between 0° and 90° from the solar simulator beam direction. Superimposed onto this spinning motion is the orbital motion $\omega$ which is simulated by oscillating basket 50 about a fixed axis 76 which is perpendicular to solar simulator beam 16. A compensating motion is then superimposed on the test satellite about an axis 78 parallel to the simulator beam which compensating motion does not upset the relationship between spin axis 73 and the solar simulator beam 16 because the skew angle at all times remains the same, but does provide the correct relative motion between the albedo-planetary emission simulator 63 and the test satellite 61 even though simulator basket 50 does not move more than plus or minus 90°.

The oscillatory motion of the basket 50 preferably is programmed so that the axis of symmetry thereof 79 intersects the solar simulator beam at an angle $\sigma_s$ which is equal to the angle formed by the satellite-planet line and the sun-planet line. The required motion may be found by applying the principles of analytical geometry by means of which the following equation may be derived:

$$\omega_{basket} = \frac{dT}{dt} = \frac{-\omega \sin \lambda \cos \omega t}{\sqrt{1 - \sin^2 \omega t \sin^2 \lambda}}$$

where $\lambda$ is the angle between a line normal to the plane of the orbit and the sun-planet line and $\omega_{basket}$ is equal to the required angular velocity of albedo-planetary emission simulator basket 50. A plot of this equation shows that the basket reverses direction when $$\omega t = \frac{\pi}{2} \pm \lambda$$

The maximum excursion of the basket does not exceed 90° since $\lambda$ does not exceed 90°.

Derivation of the compensation motion is shown geometrically in FIG. 12 wherein a circular orbit 80 is seen first projected along a line 81 normal to the orbit and then along lines 82 parallel to the satellite-sun direction. From the two views of the angle $\theta$, the following equation may be derived:

$$\frac{\omega_c}{\omega} = \frac{\cos \lambda}{(1 + \tan^2 \omega t \cos^2 \lambda) \cos^2 \omega t}$$

where $\omega_c$=the required angular velocity about the compensation axis 78. In this equation, as $\lambda$ approaches 90° the angular velocity of the compensation axis becomes very large compared to the orbital angular velocity of the satellite. Since the orbital angular speed is rather slow, approximately $\frac{1}{90}$ r.p.m. for a 100-mile earth orbit, the actual speed of the compensation axis will not be required to exceed 5 r.p.m. At 5 r.p.m. it will take 6 seconds to make an "instantaneous" turn of 180°, however during this 6 seconds the basket is virtually motionless with its axis of symmetry parallel to the solar simulation beam and to the compensating axis. Consequently, no significant loss of simulation results from such a time lag.

The albedo simulator source illustrated in detail in FIG. 13 comprises a plurality of standard 2½ inch diameter 100 watt reflector type flood lamps 51 preferably surrounded by a liquid nitrogen cooled housing 83. A small panel of aluminum honeycomb 84 preferably having an $L/D$ ratio of 2.83 may be located just ahead of the lamp to block rays not directed toward the 3-foot diameter zone occupied by the test satellite. A flat lens 85 of heat resistant material such as Pyrex may be used on each lamp unit to shield the test satellite from long wavelength radiation from the hot lamp envelope and the hot honeycomb panel. Such shielding serves to insure that the test satellite will receive significant long wavelength radiation through only the earth emission simulations sources. The lamp intensity can be adjusted to compensate for errors in absorbtivity. For satellites with multiple surface finishes the total absorptivity of each of the types of finish with respect to 3,000 K. black body radiation must be determined to see if the error will be significant. The lamp described above has been satisfactorily used in providing desirable beam characteristics for simulating solar heating of the test satellite.

FIG. 14 shows a plot of data using the lamps described and compares the power distribution for a shielded lamp against one that is unshielded. The plot shows the amount of radiant power in a one inch wide annular ring of radius R. All intensity measurements were made in a plane 51 inches from the lamp face and were multiplied by $2\pi R$. The amount of power that will impinge on a 3-foot diameter model from a single lamp operating at rated power may be ascertained by integrating the resulting curves from $R=0$ to $R=18$. Integrating from $R=18$ on out provides the amount of power that will spill around the 3-foot test satellite thence to be reflected or absorbed by the satellite support arms, basket structure, or cold shroud. Honeycomb shield 84 drastically reduces the spill-over thus minimizing the possibility of energy reflecting back onto the satellite. Useful radiation is reduced only by about 30% through use of the shield thus leaving 18.2 watts of useful power per lamp at rated output for an overall efficiency of 18.2%. The number of lamps used has been determined by considering operation at about two-thirds of rated lamp power so as to increase the life expectancy of the lamps.

The maximum albedo power requirements have been determined to occur when the altitude H is a minimum and orientation angle $\sigma$ is zero. The lowest orbital altitude that is likely to be encountered is $H=100$ miles. It can be shown that for an altitude H equals 100 miles, and $\sigma$ equals zero the total albedo power incident on a 3-foot diameter model is 486 watts.

It will be appreciated therefore that the placement of the albedo simulator lamps 51 and the power settings of the lamps are important factors in the present invention. The albedo simulation array of lamps 51 shown in FIG. 9 is primarily based on (1) the number of lamps required or desired, (2) the positioning of the lamps in order to achieve an acceptable distribution of energy flux incident on the test satellite, and (3) the relative power levels which should be applied to the various lamps in order to distort the energy flux distribution incident on a test article so that it matches or substantially matches the theoretical curves for different satellite altitudes and orientation angles.

The number of lamps 51 used may be determined by how much "ripple" is acceptable around the test satellite. A large number of small lamps has been selected since such an array gives a more even distribution of incident energy flux than a smaller number of larger lamps. Summing the energy contribution by each lamp in the array for several points around the test satellite permits a determination to be made of the amount of "ripple" imposed by a given array of lamps.

The "ripple" associated with the present preferred 48-lamp array for a typical set of simulation condition is shown in the graph of FIG. 15. It has been determined that the ripple with respect to attitude angle $\beta$ is simply a periodic deviation of the curves of the simulated device with respect to the desired values. It has been deemed preferable that in the lamp arrangement each spoke 60 shown in FIG. 9 schematically should contain an equal number of identical lamp units and that the lamp distribution should be similar along each spoke.

As shown in FIG. 9, lamps 51 preferably are spaced similar distances from the equatorial band 62 of simulator 50 so as to lie in a plurality of lines of latitude 89 which are parallel to band 62. Lines 89 are located in such a manner that the combined radiation from all of the lamps operating at an equal power level provides an incident energy distribution on a three-foot diameter test satellite substantially duplicating that encountered by an Earth satellite oriented at $\sigma$ equals zero and at an altitude of 100 miles since it is at this orientation and low altitude that maximum albedo power is required. The relative power level of lamps in each line may be altered to either improve the distribution curve match for the condition $H=100$, $\sigma=0°$ or to distort the curve so that it matches the $\sigma=0°$ curve for some other altitude or some other test satellite diameter.

The energy flux distribution profile incident on the test satellite can be determined by performing the summation for several points on the test satellite from the following equation:

$$\frac{E_m}{(E_B)_{\rho=51}} = \sum_{i=1}^{i=n}\left(\frac{51}{\rho_i}\right)^{1.93} \cos^{12}\alpha_{s_i} \cos\alpha_{m_i}$$

where:

$\alpha_m$ is the angle of incidence,
$E_B$ is the local beam energy flux,
$\alpha_s$ is the divergence angle of the lamp beam,
$\rho$ is the distance from the lamp center to a given point on the satellite it being readily determinable that the local beam intensity for the selected lamp units varies directly with $\cos^{12}\alpha_s$ and inversely with $\rho^{1.93}$. Optimum locations for lines 89 may be reached by summing profiles for different values of $r_s/s_{nom}$ ranging from 0.1 to 1.0. The values of $r_s/s_{nom}$ corresponding to the resulting profile which most nearly matches the $H=100$ miles, $\sigma=0°$ curve of FIG. 7 may be used to determine the optimum line locations. By introducing a weighting factor into the summation equation the contribution of any lamp may be attenuated as it would be if the lamp were operated at reduced power. The modified equation is:

$$\frac{E_m}{(E_B)_{\rho=51}} = \sum \psi_i \left(\frac{51}{\rho_i}\right)^{1.93} \cos\alpha_{s_i} \cos\alpha_{m_i}$$

where $\psi_i$ is the weighting factor. Multiplying the profile for each of the selected values of $\psi$ provides a resulting profile substantially matching the desired curve for a specific altitude. Tables 1, 2 and 3 which follow

TABLE 1

| $r_s/s_{nom}$ | $\beta$ → | | | | | $\psi$ ring |
|---|---|---|---|---|---|---|
| | 0° | 40° | 80° | 120° | 160° | |
| .4 | 10.3064 | 4.8319 | 0.2518 | 0 | 0 | 1. |
| .5 | 7.4900 | 4.9384 | 0.4559 | 0 | 0 | 1. |
| .6 | 5.0684 | 4.8399 | 0.7303 | 0 | 0 | 1. |
| .8 | 1.6110 | 3.4943 | 1.6797 | 0.0229 | 0 | 1. |
| 1.0 | 0 | 0.3.78 | 2.7754 | 1.3702 | 0 | 1. |
| 1.0 | 0 | 0.3878 | 2.7754 | 1.3702 | 0 | 1. |
| Sum | 24.4758 | 18.8801 | 8.6685 | 2.7633 | 0 | |
| Norm Sum | 1.2964 | 1.0000 | 0.4591 | 0.1464 | 0 | |

TABLE 2

| $r_s/s_{nom}$ | $\beta$ → | | | | | $\psi$ ring |
|---|---|---|---|---|---|---|
| | 0° | 40° | 80° | 120° | 160° | |
| .4 | 6.3900 | 2.9958 | 0.1561 | 0 | 0 | 0.62000 |
| .5 | 5.2998 | 3.4943 | 0.32261 | 0 | 0 | 0.70758 |
| .6 | 3.3975 | 3.2443 | 0.4895 | 0 | 0 | 0.67033 |
| .8 | 1.6110 | 3.4943 | 1.6797 | 0.02288 | 0 | 1.00000 |
| 1.0 | 0 | 0.3494 | 2.5005 | 1.23451 | 0 | 0.90097 |
| 1.0 | 0 | 0.3494 | 2.5005 | 1.23451 | 0 | 0.90097 |
| Sum | 16.6983 | 13.9276 | 7.6490 | 2.4919 | 0 | |
| Norm. Sum | 1.1989 | 1.0000 | 0.5492 | 0.1789 | 0 | |

TABEL 3

| $r_s/s_{nom}$ | $\beta$ → | | | | | $\psi$ ring |
|---|---|---|---|---|---|---|
| | 0° | 40° | 80° | 120° | 160° | |
| .4 | 7.2145 | 3.3824 | 0.1763 | 0 | 0 | 0.7000 |
| .5 | 4.9934 | 3.2923 | 0.3040 | 0 | 0 | 0.6667 |
| .6 | 0.6758 | 0.6453 | 0.0974 | 0 | 0 | 0.1333 |
| .8 | 1.6110 | 3.4943 | 1.6797 | 0.0229 | 0 | 1.0000 |
| 1.0 | 0 | 0.1681 | 1.2027 | 0.5938 | 0 | 0.4333 |
| 1.0 | 0 | 0.1681 | 1.2027 | 0.5938 | 0 | 0.4333 |
| Sum | 14.4947 | 11.1504 | 4.6626 | 1.2104 | 0 | |
| Norm. Sum | 1.2999 | 1.0000 | 0.4182 | 0.1086 | 0 | | show individual profiles for the six parallel lines of lamps 51 and the resulting summation for three conditions of attenuation. In the foregoing tables, $r_s$ is the perpendicular distance from the basket axis of symmetry 79 to the center of the lamp face, and $s_{-nom}$ is the distance from the face of a lamp to the center of the test sphere or satellite. FIG. 15 also provides a comparison between the simulated and the real albedo energy flux distribution based on a three-foot diameter spherical test item in a concentric hemispherical 48-lamp array whose radius of curvature is 51 inches. To properly distort the energy distribution incident on the test item so that it matches the non-symmetrical profiles encountered when $\sigma$ is other than zero, the lamp control circuit, not shown, preferably is split into two zones 92 and 93 as shown in FIG. 16 so that one side of the lamp array may be operated at reduced power relative to the other. It will be appreciated that a larger number of zones may be used within the inventive concept, allowing greater flexibility in matching different profiles but increasing costs and reducing reliability. FIG. 15 further shows an acceptable approximation via the two-zone simulator array of the non-symmetrical albedo energy distribution incident on a satellite at various solar orientation angles.

In FIG. 16 it is noted that splitting six lines of lamps into two halves results in forming twelve groups as indicated by the numerals on the lamp faces. Any given lamp 51 is a member of both a line 89 and a zone 92 or 93. The total attenuation factor for a lamp is therefore the product of its line attenuation times its zone attenuation. All lamps in a given group thus have equal attenuation factors and can be controlled from a common powerstat. The above sets forth how in the present embodiment the required relative power settings for the twelve groups of four lamps in the preferred albedo simulator array are determined for a typical set of altitude and orientation conditions.

The simulation of the absolute power input to the satellite is determined in the following manner. The absolute power required from each lamp in order to match the total power input is given by the following equation:

$$P_{lamp} = \frac{P_{albedo}(\psi)_{lamp}}{n(\psi)_{av.}}$$

where:

$P_{lamp}$ is the total power radiated by the lamp in all directions contained within the solid angles subtended by the test satellite;

$P_{albedo}$ is the total albedo power incident on the satellite in space at the altitude and orientation being simulated, see FIG. 8;

$(\psi)_{lamp}$ is the attenuation factor for the group in which the lamp exists;

$(\psi)_{av.}$ is the average of the attenuation factors of all of the lamps in the array; and $n$ is the total number of lamps in the array. The power required from a given group of lamps is simply the number of lamps in the group times $P_{lamp}$.

$$P_{group} = \frac{P_{albedo}(\psi)_{group} n_{group}}{\psi_{av.} n_{total}}$$

In order for simulator 50 to be able to handle elliptical orbits of any inclination angle $\lambda$ and any altitude $H$, a catalog of attenuation factors may be computed using the procedures that have just been described. The set of curves illustrated in FIG. 17 may be generated for each of the twelve groups of lamps and committed to the memory of a computer program which may be used to control the simulator. Then, as the computer calculates the altitude $H$ and the orientation angle $\sigma$ as functions of time for a given orbit such as the elliptical orbit 95 indicated with a broken line in FIG. 17, it can read out the proper power levels for the twelve lamp groups as functions of time.

In order that the simulated planetary emission energy flux distribution incident on the test satellite may be changed so that different altitudes can be simulated it is preferable that either the radiating rings 54-58 be movable or their relative temperatures be variable. In the present embodiment, the relative temperature method has been employed because of its obvious advantage of simplicity. Operating the five rings 54-58 at dissimilar temperature will cause the spectral distribution of each to be slightly different due to the Wien Displacement Law, but since almost all materials likely to be encountered on a test satellite have virtually a flat response for wave lengths beyond 10 microns, this presents no serious problem. Thus, the temperature of all the rings 54-58 may be elevated considerably above 300 degrees K. without significantly affecting the spectral simulation.

The method for determining the locations of planetary emission simulator rings 54-58 for the desired incident energy flux distribution on the test satellite is in principle identical to the method used to determine the albedo lamp placement. Each ring 54 through 58 in FIGS. 9 and 10 may be considered as though it were an array of small lamps of equal diameter placed edge to edge. Each hypothetical lamp of a given ring is assumed to emit diffuse radiation with equal intensity. The energy flux incident at any point on the surface of the test satellite can therefore be determined by summing the flux contributed by each of the imaginary lamps in the ring. The resulting equations are very similar to the summation equations used in the albedo simulator analysis and therefore will not be presented here. Having each of these equations, the computer program developed for solving the albedo simulation equation can be easily modified to compute the planetary emission simulation equation as well. The flux distribution on the test satellite due to the energy emanating from each ring location may be examined and final locations then may be selected from the distribution curves which when summed and normalized most closely approximate the desired distribution for the $H=100$ miles case. As stated for the albedo simulator the total match can be further refined by multiplying each of the five individual distribution curves by an appropriate attenuation factor, $\psi_{ring}$, before they are summed. The values of $\psi_{ring}$ necessarily are determined by trial and error.

Applying the procedure described to the $H=100$ miles and $H=1,000$ miles cases using a test satellite radius $R_m$, of 18 inches and a distance from the center of the test satellite to the face of the emitting ring, $S_{nom}$, as 51 inches gives a diameter $D_B$ of the imaginary lamps forming the rings of $2\pi$ inches. These values provide a total face area equal to that which would exist if the ring strips were uniformly one-half inch wide instead of being composed of small circles placed edge to edge.

It may be noted that the same line coordinates used for the albedo simulator array also provide an acceptable match for the earth emission simulator. Table 4 below lists Earth emission simulator ring configurations for an altitude of 100 miles.

is required at $r_s/s_{nom}=1.0$ for Earth emission simulation whereas two rings are used in the albedo array. The column entitled Relative Temperature is the ring attenuation factor, $\psi_{ring}$, raised to te one-fourth power. This additional step is desirable for the Earth emission simulation array of rings 54-58 because unlike the albedo array of lamps 51 the planetary simulator rings will be controlled by temperature rather than power.

The summed and normalized distribution shown in Table 4 is very close to the desired distribution for $H=100$ miles. The same similarity exists between the normalized distribution match for simulating $H=1,000$ miles.

It has been established supra that a 3-foot diameter spherical satellite 100 miles above the earth will receive 223 watts of radiant energy due to earth emission. This may represent the maximum amount of power that the planetary emission simulator embodied in this application will be required to supply, first because a 3-foot diameter test article is the largest that can be contained within a solar simulation beam of the size provided and second, because orbital altitudes of less than 100 miles are not likely to be encountered. For the purposes of the present embodiment, it is therefore assumed that 223 watts is the maximum amount of power that the five heated simulator rings 54-58 impart to a 3-foot diameter test article.

The total power emitted by the face of the rings must of course be somewhat larger than the power incident on the test article because some of the radiation leaves in directions which do not intercept the test satellite. What fraction of the energy emitted by a ring does not impinge on a test article may be computed by integrating the flux distribution curves developed above. Since the test specimen is centrally located and is approximately spherical, the fraction is identical for each ring and is equal to the form factor between an infinitesimal disc, not shown, and a parallel finite disc, not shown, where the finite disc diameter is approximately equal to the test satellite diameter and the separation distance along the center normal to the disc is equal to the distance from the ring face to the center of the test area.

The following equation gives the exact disc size as a function of the radius of the spherical test satellite:

$$\frac{R_{disk}}{R_m}=\sqrt{1-\left(\frac{R_m}{s_{nom}}\right)^2}$$

by substituting $s_{nom}=51$ inches and $R_m=18$ inches it is seen that $$R_{disk}=18\sqrt{1-\left(\frac{18}{51}\right)^2}=16.8 \text{ inches}$$

It can be shown by integrating appropriate form factor equations that the total ring face area must be large enough and hot enough to emit approximately 10 times the power required at the test satellite zone for stimulating planetary emission. The power emitted by a particular ring is a summation of the area of the ring face and the radiant energy flux emitted by the ring face. The area of the face is equal to the ring width $w$, times the circum-

TABLE 4

| Ring Do. | $r_s/s_{nom}$ | β | | | | $\psi$ ring | Relative Temp. |
|---|---|---|---|---|---|---|---|
| | | 0 | 40 | 80 | 120 | | |
| 1 | .4 | .00813 | .00416 | .00030 | 0 | 0.6200 | 0.887 |
| 2 | .5 | .01326 | .00802 | .00106 | 0 | 1.0000 | 1.000 |
| 3 | .6 | .00483 | .00365 | .00078 | 0 | 0.4000 | 0.795 |
| 5 | .8 | .00588 | .00865 | .00471 | .00005 | 0.9500 | 0.9875 |
| 5 | 1.0 | 0 | .00175 | .00798 | .00497 | 0.9500 | 0.9875 |
| Sum | | .03210 | .02623 | .01483 | .00502 | | |
| Norm. Sum | | 1.224 | 1.000 | 0.564 | 0.191 | | |

Selected Earth emission flux distribution for the $H=100$ mile case is therefore very similar to its albedo counterpart. It may be noted in the above table that the selective Earth emission flux distribution differs as far as the line and ring coordinates are concerned only in that one line ference and therefore:

$$A_i = W 2\pi \left(\frac{r_s}{s_{nom}}\right)_i s_{nom}$$

where W is the ring width.

The energy flux emited by a particular ring for simulating some particular altitude may be considered a fraction of the flux emitted by the hottest ring in the ring array. The total power emitted by all five rings may be shown to be given by the following equation:

$$P = 2\pi W \cdot s_{nom} \cdot E_{max} \cdot \sum_{i=1}^{i=5} \left(\frac{r_s}{s_{nom}}\right)_i \psi_i$$

In order to provide the correct amount of power for planetary emission simulation at the test satellite zone the following condition must be met:

$$P = \frac{P_{P.E.}}{F_{(dA_1)(A_2)}}$$

where $P_{P.E.}$ is the total planetary emission power that is incident on the satellite at the altitude being simulated. Therefore:

$$E_{max} = \frac{P_{P.E.}}{2\pi W \cdot s_{nom} \cdot F_{(dA_1)(A_2)} \cdot \sum_{i=1}^{i=5} \left(\frac{r_s}{s_{nom}}\right)_i \psi_i}$$

The required temperature for the hottest ring in the array, the one for which $i=1.0$, can now be determined from the Stefan-Boltzmann equation:

$$T_{max} = \left[\frac{E_{max}}{\sigma \epsilon}\right]^{1/4}$$

where: $\sigma$ is the Stefan-Boltzmann constant, $\epsilon$ is the emissivity for the ring face, which is equal for all rings. Assuming the ring emissivity is 0.9 and taking $s_{nom}$ as 51 inches (129.5 cm.) and the ring width W as one-half inch (1.27 cm.), the required temperature for the number four ring $$\left(\frac{r_s}{s_{nom}} = .8\right)$$

may be determined by the preceding two equations to be 176° F. The required temperatures for the other four rings for simulating $H=100$ are determined by the relative temperature coefficients given in Table 4.

Since all points on all of the ring faces have an equal form factor with respect to the entire test item, the ring width W can be changed without affecting $F_{(dA_1)(A_2)}$. This fact makes it possible to easily compute the required temperature for the various assumed values of ring width which has been done for the $H=100$ mile example. The resulting $T_{max}$ required is plotted as a function of ring width in FIG. 18. The required temperatures for the other four rings for simulating $H=100$ miles may be determined by the relative temperature coefficients given in Table 4.

FIG. 19 shows in block form the type of control system that is preferred for the albedo-planetary emission simulator. The entire system is controlled by digital tape reader 100 which operates in real time. The control tape is of course recorded at a much faster speed so that only a few seconds of computer time are required to compute the control data for a 19-minute orbital period. Input data is required relating to satellite diameter, orbital parameters which include λ, the angle between the sun-planet line and a line normal to the orbital plane, the apogee, the perigee and the angle between the apogee and the point where the orbit first crosses the twilight line, and the mean radius of the planet. Also required for use in the computer is a table of albedo lamp intensity as a function of altitude H and orientation angle σ for each of the twelve lamp groups. If the required computer storage capacity is not available, it may be possible to approximate the curves for each altitude with an equation. A computer then may be programmed to select the proper equation and compte the intensity for each of the twelve lamp groups.

In addition to the data input required by the computer, the following conditions must be set into the simulator:

(1) The angle $\phi$ between the model spin axis and the solar simulator beam must be adjusted to the proper value prior to the test;

(2) The spin rate $\omega_r$ must be adjusted to the proper value;

(3) A proper set of planetary emission simulator cams must be generated and installed; and (4) The proper voltage must be placed across the cam potentiometer. Items (1) and (2) are simple adjustments, however, the cams referred to in item (3) preferably are formed so that the percent of full cam-follower displacement which exists for each of the cams at a particular angle of rotation, $\mu(H)$, portrays the planetary emission attenuation factor for each of the five rings. These attenuation factors are not only functions of altitude H but also of planet radius, planet emissivity, planet temperature, and satellite diameter. Changing either the planet radius or the satellite diameter will modify the desired form factor distribution and thus the relative attenuation factors for the rings. Consequently, changing either of these parameters may necessitate a change of cams. A change in planet emissivity or planet temperature, however, can be accommodated merely by changing the applied voltage across the respective potentiometers.

It may be noted in FIG. 19 that closed-loop servo control is selected for all channels. Such action assures accuracy of position and intensity over extended periods of time. The closed loop servo does this by nulling the difference between the desired position or intensity (indicated by the signal from the digital-to-analog converter) and the actual position or intensity pattern indicated by a feedback signal along leads 103, 104 and 105 from the drive motor 108, photocell 109 or the thermocouple 110 respectively. Changes due to such things as amplifier gain variation, line voltage fluctuations, and deterioration of lamp efficiency are thus compensated for automatically. The photocells used for generating the feedback signal in the albedo simulator lamp intensity control loop previously have been calibrated against an absolute radiometer. This calibration is then included in the computer program so that the intensity signal delivered by the digital-to-analog converter is equal to what the photocell puts out when the radiant energy flux of the lamp beam is at the desired level.

Structural details of the present embodiment of the invention include a requirement generally that the test satellite support and albedo-planetary emission simulator structures present the least possible blockage of cold wall 20 as seen from the test satellite. The structure preferably is compact radially and is located as far outboard of test satellite 61 and as close to the cold wall as possible. Reflections of the test article are kept to a minimum. The test satellite or model preferably is spherical and has a maximum diameter which permits it to be accommodated within solar beam 16 and a weight commensurate with its support structure. Satellite 61 preferably has its center of gravity located at its geometric center and on a spin axis. Attachment to the test satellite support system preferably is located on the spin axis of the model. Additionally, the model or test satellite of the present embodiment preferably has a spin rate range of from 0 to 100 r.p.m., and a maximum of 100 circuits for data readout from the test satellite.

As seen in FIGS. 20 and 21 the test satellite support system includes several components, the basket support 113, the satellite support structure or arms 72, the spin drive assembly 115 and orbit compensation drive assembly 116, and the mechanical-structural support and rotational joints. Support arm structure 72 in the present embodiment provides support in which the maximum deflection of a 300 lb. test satellite or model is substantially 1.0 inch when the movable arms 67, 119, 120, 121 and 122 are in a folded arangement as shown in FIG. 20. When movable arms 67 and 119–122 are in the extended arrangement as shown in FIG. 21, the total deflection for the 300 lb. satellite is substantially 0.5 inch. The bending and torsional moments for satellite 61 produce stresses of a relatively low magnitude which do not significantly affect the disposition of the satellite in solar beam 16 or in its orbital simulation movement. The shape, material, size and structural qualities of the supporting structure may vary within selected limits so long as they provide least profile and maximum stiffness. Support arms 72 in the present embodiment preferably are cylindrical in cross section and of a material and size to be suitable for use with well known equations related to angular twist, torsional movement and torsional rigidity. Since the most rigid section should include the greatest area with the least perimeter, i.e. a circular section, 3-inch O.D. ¼-inch thick tube sections have been selected for the present embodiment. Steel or steel alloy preferably is the material used to construct support arms 72 although it will be appreciated that other materials may be used.

Although three drive units may be used to provide continually varying velocities so as to apply orbit compensation motion, the present embodiment of the simulator is arranged so that the same functions may be provided by two drive assemblies, namely, a satellite spin drive shown schematically at 115 an orbit compensation drive shown schematically at 116. Extending arm 122 across the simulator basket provides a one-fourth reduction in the deflection component over that of a half-span or cantilever arm. Full span arm 122 is fixed in the horizontal plane in FIGS. 20 and 21 and as a consequence provision is made, not shown, to rotate the support structure in order to gain greater access to the test satellite. Counterbalancing arms 120 and one-half of 121 are included to minimize the rotational moment as applied to the orbit compensation drive.

The two drive assemblies, not shown in detail, are substantially identical, differing only in that suitable means may be required such as the slip ring assembly in the orbit compensation drive to contain additional circuits for the motor and angular position readout of the satellite spin drive assembly. The motor drive units in the two assemblies differ in function in that the satellite spin drive is assumed to have a constant rotational spin rate for a given test satellite and test run. However, the spin rate would vary from model to model and presumably from test run to run for a given model. It is assumed in the preferred embodiment that spin axis 73 will pass through the CG of the test satellite and the article spin rate may be any specific velocity between 0 and 100 r.p.m. As to the orbital compensation drive, the compensating function thereof requires a motor velocity of from 0 to 5 r.p.m. adapted to be continually variable at a programmed rate.

The albedo-planetary emission simulator structure shown in FIGS. 9 and 10 is of such a form as to be readily analyzed structurally as well as permitting the albedo lamp units to be located at many selected positions along the structural members. The simulator structure is unique and provides that the major loading is the weight of the structure itself, namely 165 lbs. plus an additional 40 lbs. for the albedo lamp units. These lamp units are arranged so that the direction of loading changes as the simulator is rotated about its axis. As has been indicated in reference to FIG. 9, the simulator structure comprises a circular equatorial belt 62 and four intersecting circular arch-trusses 60. The total maximum unbalanced moment of the simulator is estimated to be substantially 6,200 inch-pounds. One-half of the moment is taken by the drive motor and the other one-half may be resisted by a suitably positioned counter-weight assembly.

Since simulation of a free space radiation sink would require a chamber wall temperature of about 3° K. to be maintained, a compromise for accomplishing an acceptable temperature constant has been adopted in that liquid nitrogen, not shown, preferably is used in the space chamber cold walls 20 and is pumped through the walls in a sub-cooled state. In the present embodiment, the heat load to the cold wall is absorbed by the liquid raising the temperature thereof so that liquid nitrogen enters the wall preferably at about 80° K. The allowable wall temperature determines the liquid flow rate and pump size. It will be appreciated that a variety of wall temperatures and test satellite temperatures may be adopted, and that simulation errors resulting from such temperatures may readily be calculated and applied to the system. In the present embodiment, a temperature of about 95° K. has been selected as a maximum allowable wall temperature. Such a maximum temperature permits keeping the radiation error to less than 5% in most cases at low cost.

While the cold wall 20 is devised so that the model does not see warm surfaces, the wall at the same time imposes as little restriction as possible on the net pumping rate of the required diffusion pumps and cryopumps, not shown. Basically, a cold wall of the configuration selected provides that no part of the 3-foot diameter test satellite "sees" any surface having a temperature greater than 95° Kelvin. A maximum conductance is maintained between the chamber section shrouded by the cold wall and the opening to the cryopump and diffusion pumps.

In the present embodiment cold wall 20 provides a clear spherical volume 9 feet in diameter inside which the albedo simulator and test satellite are placed. Shrouds or baffles such as 125 in FIG. 5 are provided where needed. The cold wall may be divided into panels of six or more separate circuits, not shown, having separate inlet and outlet pipes, so that the liquid nitrogen flow can be regulated in a manner to fit the particular test load for each circuit. The pumped sub-cooled nitrogen system selected as the means of refrigerating cold wall 20 eliminates the gas pocket problems associated with open-boiling systems, wherein high local heat loads may cause the liquid to flash to gas thus resulting in failure to maintain a uniform wall temperature. Loads imposed on the cooling systems may be computed in conventional manner. The temperature of the boiling liquid nitrogen at atmospheric pressure, or the pump supply temperature, is 77° K. Satisfactory cold panels may be made of aluminum, stainless steel, copper or other materials or metals having the required properties.

The present invention provides a unique laboratory simulation of space conditions which includes substantial duplication of the thermal inputs to a test satellite or article, permitting close observation and measurements of the effects of these inputs and, among other advantages, doing so at a great saving over the costs of launching a satellite into orbit and acquiring the data through costly telemetering equipment. The simulator of the present invention also provides a unique method and means for compiling and reviewing information related to the effects of a space environment on the mechanical and structural components of the several systems comprising the simulator.

The thermal simulation unit simulates very closely the thermal balance parameters involving a satellite in a near-Earth orbit. The concept, method and structure are unique in the space simulation field, particularly with regard to albedo and planetary emission simulation. The structural features of the albedo and planet emission basket are not to be considered as limiting the invention but are one means for accomplishing the purposes of the invention. Likewise, the radiation inputs may be introduced in other forms within the concept of the invention.

It will be recognized that many modifications and variations of the present invention are possible in the light of the above teachings. It is therefore to be understood that within the scope of the appended claims the invention may be practiced otherwise than as specifically described.

We claim:

1. A device for observing and acquiring at a local site information concerning the effects of space environments on a satellite comprising:
   - chamber means capable of substantially duplicating the pressure and temperature conditions encountered in orbit;
   - a first radiant energy source for providing a selected amount of energy to simulate insolation;
   - means for directing said radiant energy in a selected direction in said chamber means;
   - said chamber means of sufficient size to accommodate a test satellite disposed in the path of said directed radiant energy;
   - support means attached to said test satellite and said chamber means adapted to present said test satellite in various attitudes in said directed energy so as to simulate satellite movement in an Earth orbit;
   - a second radiant energy source for providing a selected amount of energy to simulate albedo radiation;
   - means for directing the radiant energy from said second source toward said test satellite; and
   - third radiant energy means for providing a selected amount of energy to simulate planetary radiant emission;
   - the energy of said third radiant energy means being directed toward said test satellite;
   - whereby the balance of radiant energy inputs and effluxes of a satellite in orbit may be simulated and their effects observed and recorded without recourse to placing a satellite in orbit.

2. The device as defined in claim 1 wherein the radiant energy from said first radiant energy source is collimated and impinges on said test satellite from a direction distinct from the directions from which radiant energy simulating albedo radiation and planetary radiant emission impinges.

3. The device as defined in claim 1 wherein said support means provides support and orbit simulating motion for at least said second radiant energy source.

4. The device as defined in claim 3 wherein said support means provides support and orbit simulating motion for said second radiant energy source and said third radiant energy means.

5. The device as defined in claim 3 wherein said second radiant energy source includes a plurality of discrete radiant energy sources.

6. The device as defined in claim 4 wherein said third radiant energy means includes a plurality of heated elements directing radiant energy toward said test satellite.

7. A method of substantially duplicating the thermal energy inputs and effluxes of a satellite in orbit comprising the steps of;
   - positioning a test satellite in an environment substantially duplicating the pressure and temperature conditions encountered in orbit;
   - computing the satellite heat load for a particular satellite and orbit;
   - directing a beam of radiant energy on said test satellite simulating solar radiation encountered in orbit;
   - directing discrete beams of radiant energy on said test satellite simulating reflected solar radiation encountered in orbit;
   - directing radiant energy on said test satellite simulating planetary radiation emission encountered in orbit; and
   - simulating satellite spin and orbital motion by superimposing corresponding movements in said directed radiant energies.

8. The method as defined in claim 7 wherein the step of simulating satellite spin and orbital motion includes the step of varying with time the magnitudes and directions of the simulated emissions of solar, reflected solar and planetary radiation incident on said test satellite.

9. A device for providing laboratory simulation of space conditions including substantial duplication of the thermal inputs to a satellite so as to achieve the heat balance of a satellite in orbit comprising:
   - chamber means capable of substantially duplicating the pressure and temperature conditions encountered in orbit;
   - solar energy input simulating means providing substantially the spectral distribution and intensity level of solar radiation directly incident on a satellite in orbit;
   - means directing said solar simulating means into a selected part of said chamber;
   - support means attached to said chamber and adapted to movably position a test satellite in said selected part of said chamber;
   - a test satellite mounted on said support means and movable about at least two axes of motion;
   - albedo energy input simulating means providing substantially the spectral distribution and intensity level of albedo radiation incident on a satellite in orbit;
   - means directing said albedo simulating means so as to impinge on said test satellite;
   - planetary emission input simulating means providing substantially the spectral distribution and intensity level of planetary emission radiation on a satellite in orbit; and
   - means directing said planetary emission simulating means so as to impinge on said test satellite;
   - whereby the balance of radiant energy inputs and effluxes of a satellite in orbit may be simulated and their effects observed and recorded without recourse to placing a satellite in orbit.

10. In a hyperaltitude chamber adapted to receive a test satellite under the temperature and pressure conditions encountered in a satellite's orbit and having a beam of simulated solar radiation directed toward the test satellite the combination therewith of:
    - an albedo radiation simulation source movably disposed in said chamber and capable of substantially duplicating the essential spectral components of sunlight reflected from a planet; and
    - means connected to said radiation simulation source for varying the intensity of the energy radiating therefrom in conformance with test satellite attitude and position in a simulated orbit.

11. The device as defined in claim 10 wherein said movably disposed radiation source includes an open regular structure on which unit sources of radiation are positioned.

12. The device as defined in claim 11 wherein said structure is hemispherical in shape and said test satellite is centrally positioned at the equator thereof.

13. The device as defined in claim 12 wherein said radiation source includes a plurality of lamps selectively spaced in said structure;
    - said lamps adapted individually to be illuminated at varying intensities so as to simulate changes in albedo radiation incident on an orbiting satellite.

14. The device as defined in claim 13 wherein said structure includes a plurality of symmetrically disposed support members each adapted to support a plurality of said lamps in a selected number of different positions.

15. The device as defined in claim 14 wherein said lamps are 100-watt reflector flood lamps;
    - each of said lamps placed in a liquified gas cooled housing; and
    - means disposed adjacent the front of said lamps for blocking rays of energy not directed toward said test satellite.

16. In a hyperaltitude chamber adapted to receive a test satellite under the temperature and pressure conditions encountered in a satellite's orbit and having a beam of simulated solar radiation directed toward the test satellite the combination therewith of;
    - an albedo radiation source movably disposed in said chamber and capable of substantially duplicating the essential spectral components of sunlight reflected from a planet;

a planetary radiation emission simulation source movably disposed in said chamber and capable of substantially duplicating the essential spectral components of radiation emitted by a planet; and means connected to said radiation sources for varying the intensity of the energy radiating therefrom in conformance with test satellite attitude and position in a simulated orbit.

17. The device as defined in claim 16 wherein said movably disposed radiation sources are mounted on an open regular structure on which sources of radiation are disposed.

18. The device as defined in claim 17 wherein said planetary emission simulation source includes a plurality of unit sources symmetrically disposed in said structure.

19. The device as defined in claim 18 wherein said structure is hemispherical in shape and said test satellite is centrally positioned at the equator thereof.

20. The device as defined in claim 19 wherein said planetary emission simulation source includes a plurality of metallic strips.

21. The device as defined in claim 20 wherein planetary emission is simulated by the application of heat to said metallic strips.

22. The device as defined in claim 21 and further including means for applying selective heating to at least some of said strips at selective intervals so as to simulate changes in planetary emission radiation incident on an orbiting satellite.

23. The device as defined in claim 22 and further including means for imparting motion to said test satellite so as to simulate satellite spin about an axis skewed at a selected angle to the direction of the simulated solar beam.

24. The device as defined in claim 23 and further including means for oscillating said structure about an axis fixed with respect to the direction of the simulated solar beam so as to simulate orbital motion of a satellite.

References Cited

UNITED STATES PATENTS

| | | | |
|---|---|---|---|
| 3,084,454 | 4/1963 | Schueller | 73—432 X |
| 3,302,463 | 2/1967 | Marfone et al. | 73—432 |

OTHER REFERENCES

Tenney Eng. Inc., Union, N.J., booklet "Space Simulators," received August 1961, 4 pages.

Goethert: "High Altitude & Space Simulation Testing," A.R.S. Journal, June 1962, pages 872, 879–882.

DAVID SCHONBERG, *Primary Examiner.*